May 16, 1933. E. BLOMQUIST 1,908,815
TRANSFORMER SELECTOR CABINET
Filed May 27, 1929 13 Sheets-Sheet 3
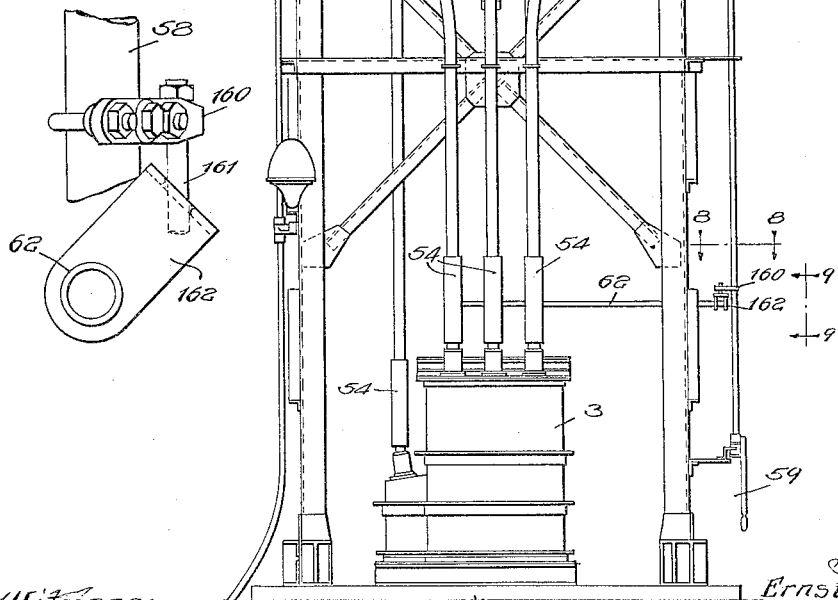
Fig. 3.
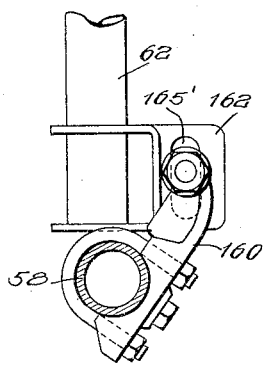
Fig. 8.
Fig. 9.
Inventor:
Ernst Blomquist
By Brown, Jackson, Boettcher & Dienner
Attys
Witness:
William P. Kilroy

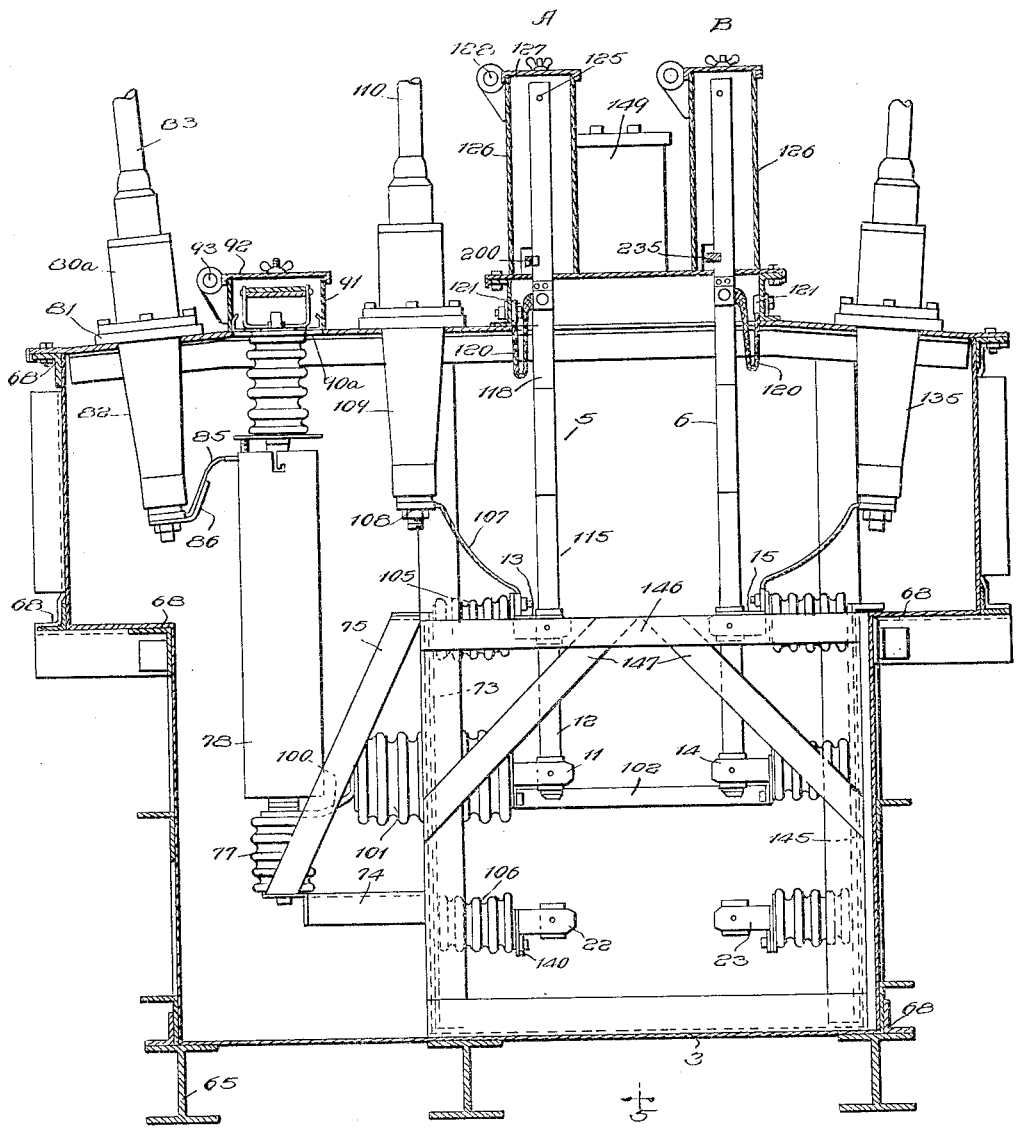

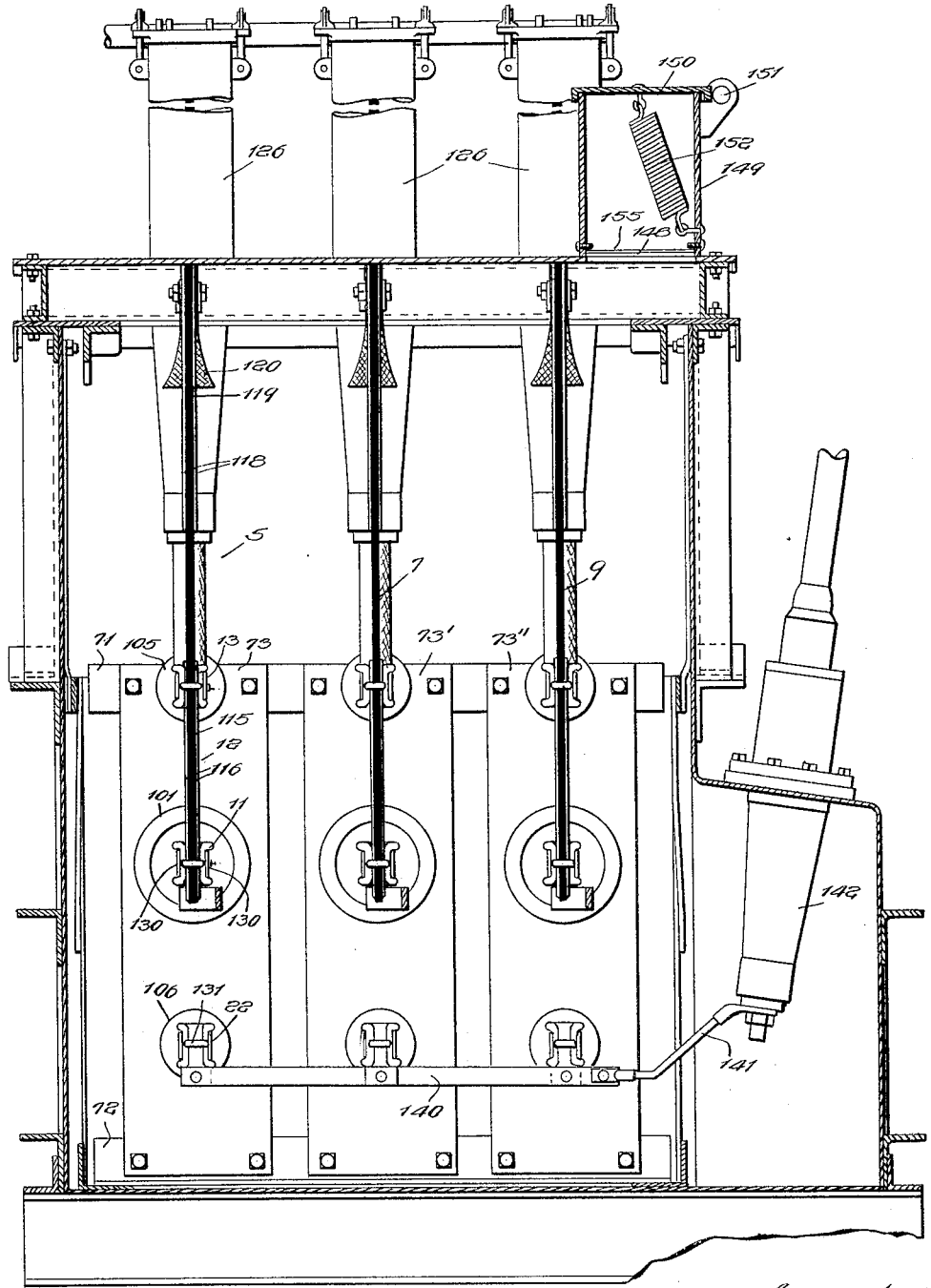

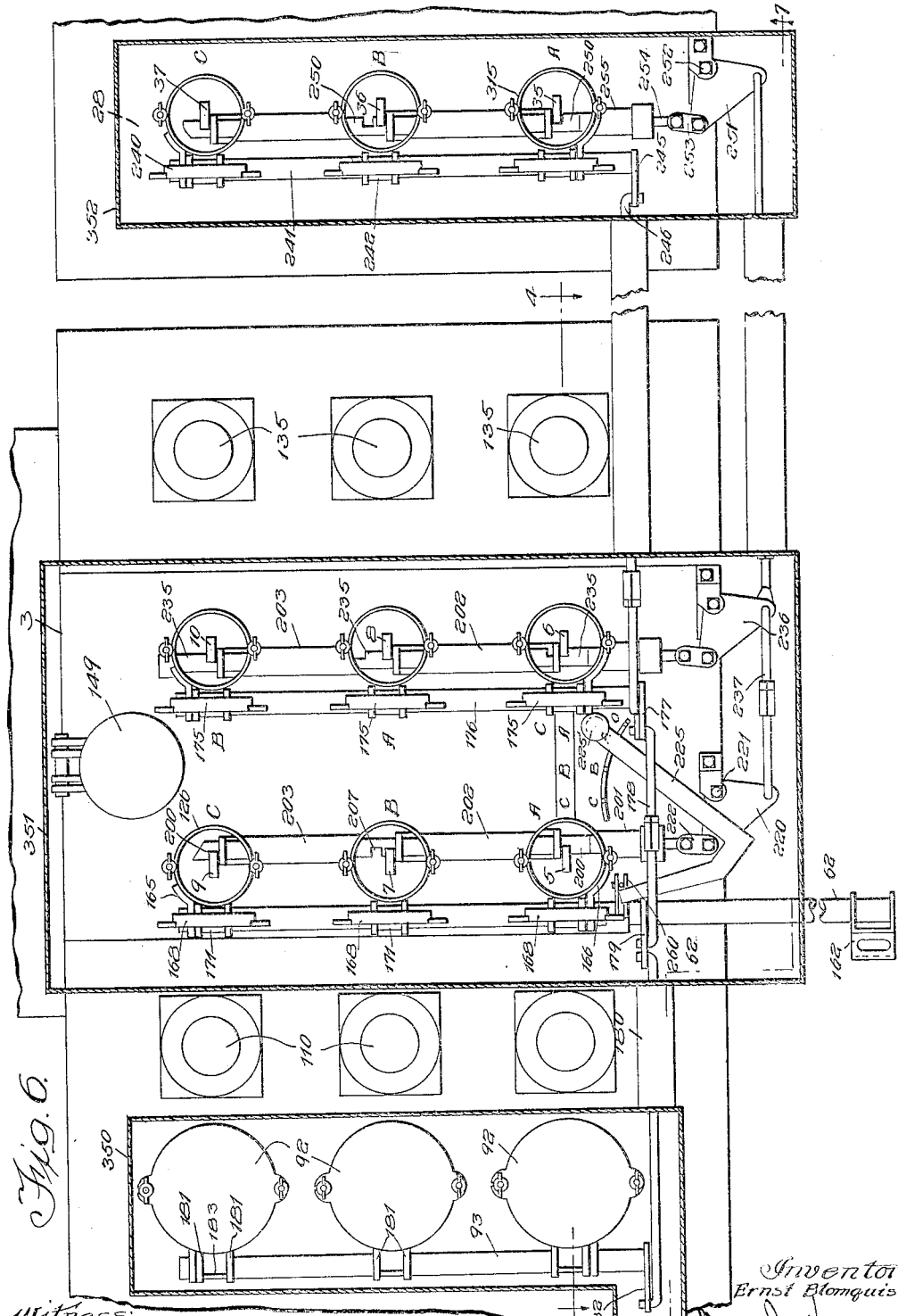

May 16, 1933.  E. BLOMQUIST  1,908,815
TRANSFORMER SELECTOR CABINET
Filed May 27, 1929   13 Sheets-Sheet 8
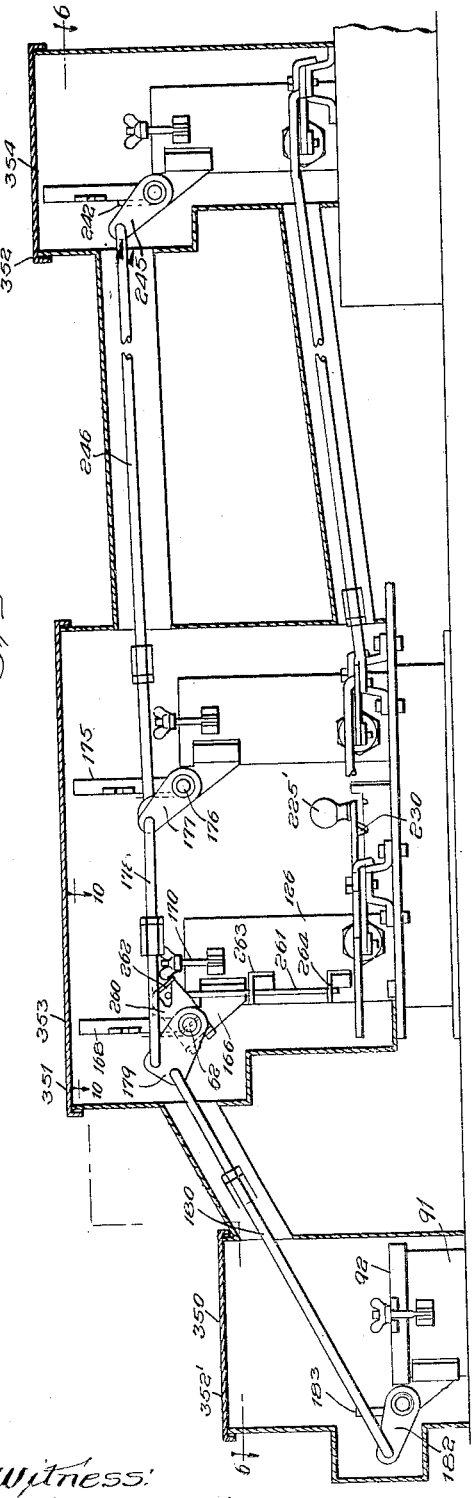
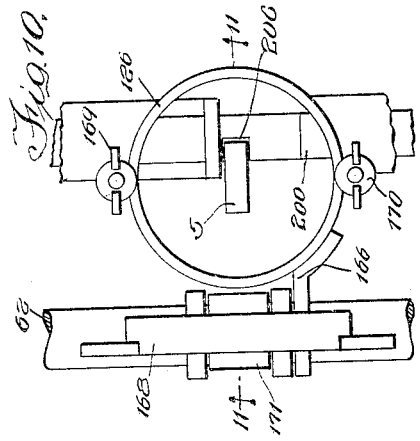
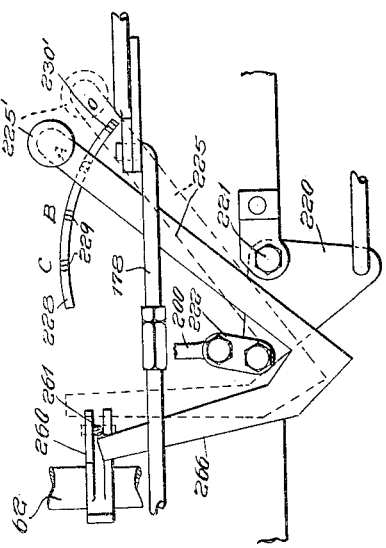
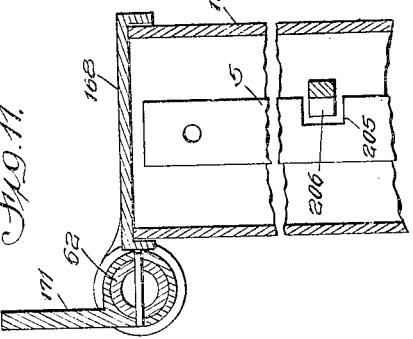
Inventor:
Ernst Blomquist
Witness:
William P. Kilroy

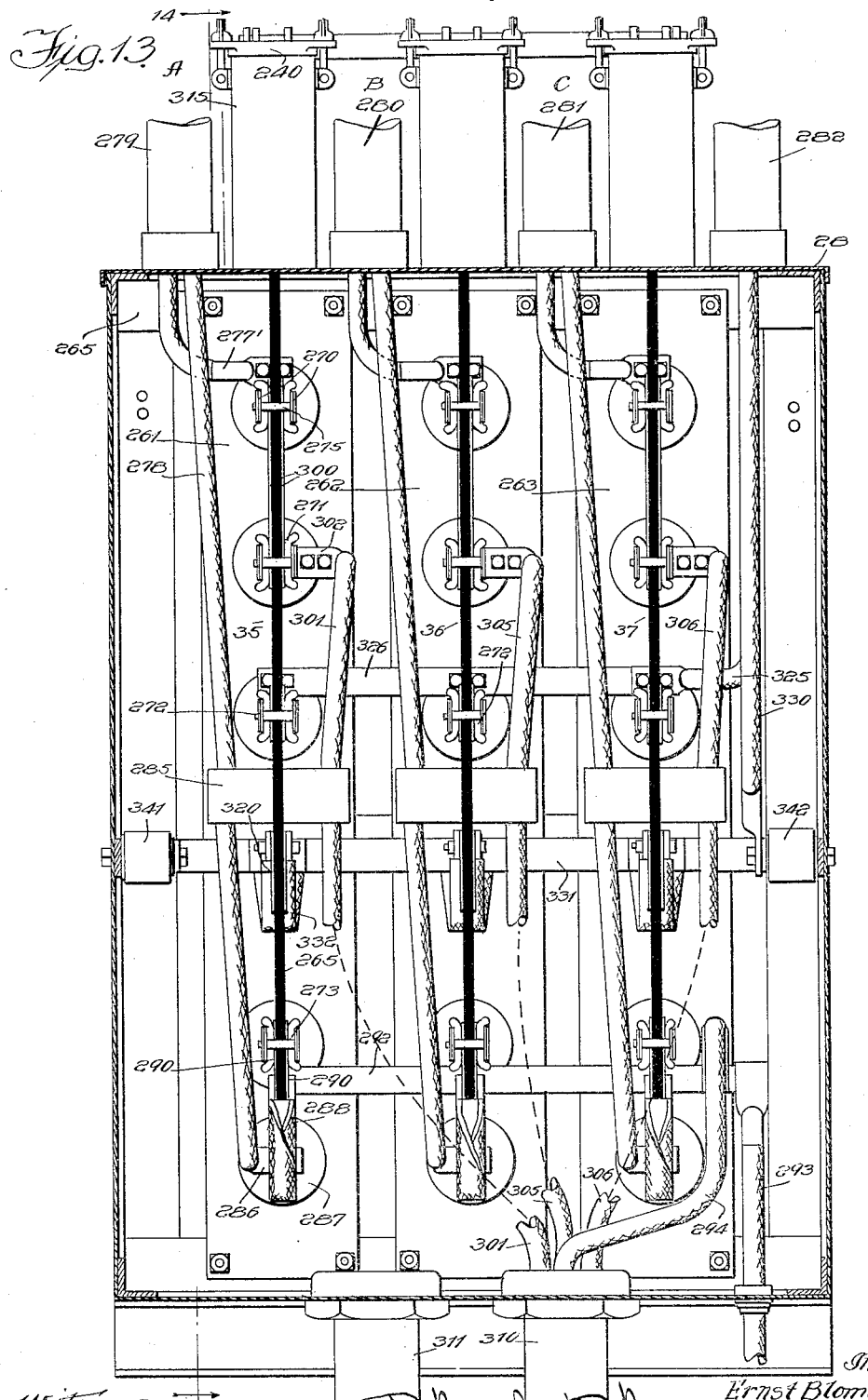

May 16, 1933. E. BLOMQUIST 1,908,815
TRANSFORMER SELECTOR CABINET
Filed May 27, 1929 13 Sheets-Sheet 10
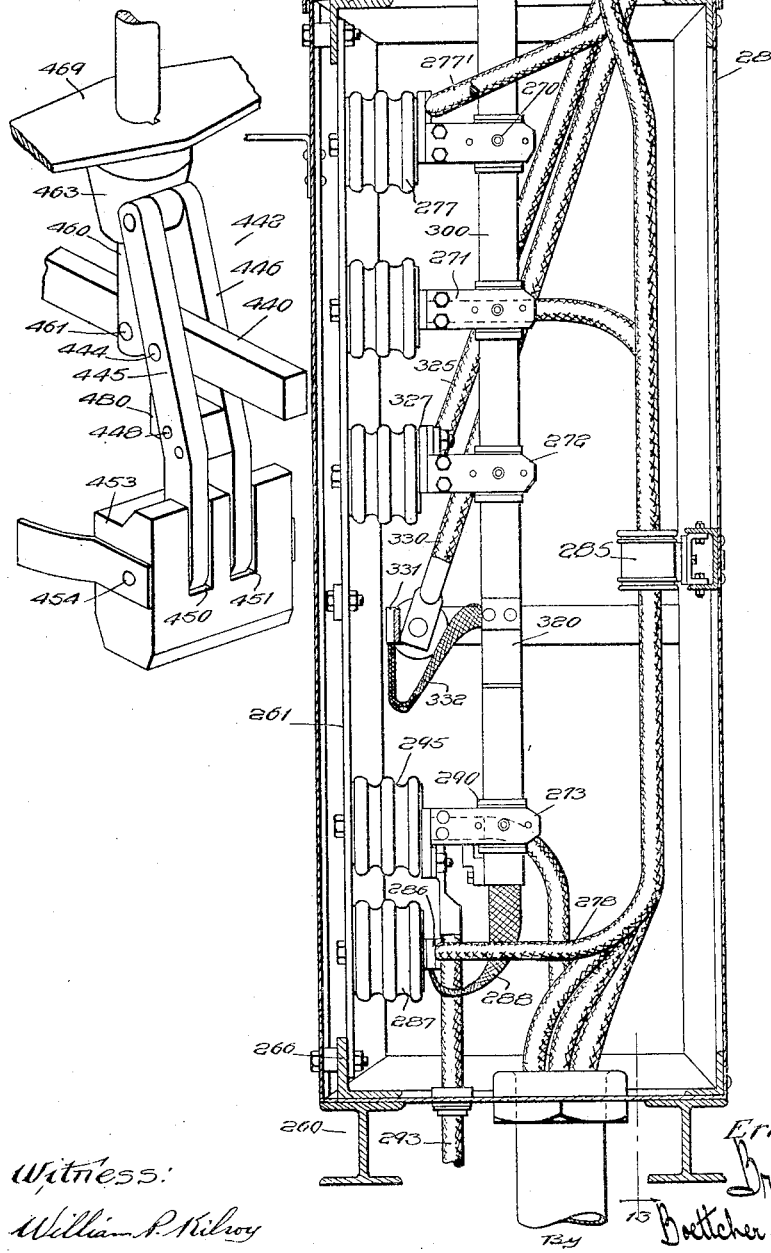

May 16, 1933.     E. BLOMQUIST     1,908,815
TRANSFORMER SELECTOR CABINET
Filed May 27, 1929     13 Sheets-Sheet 11
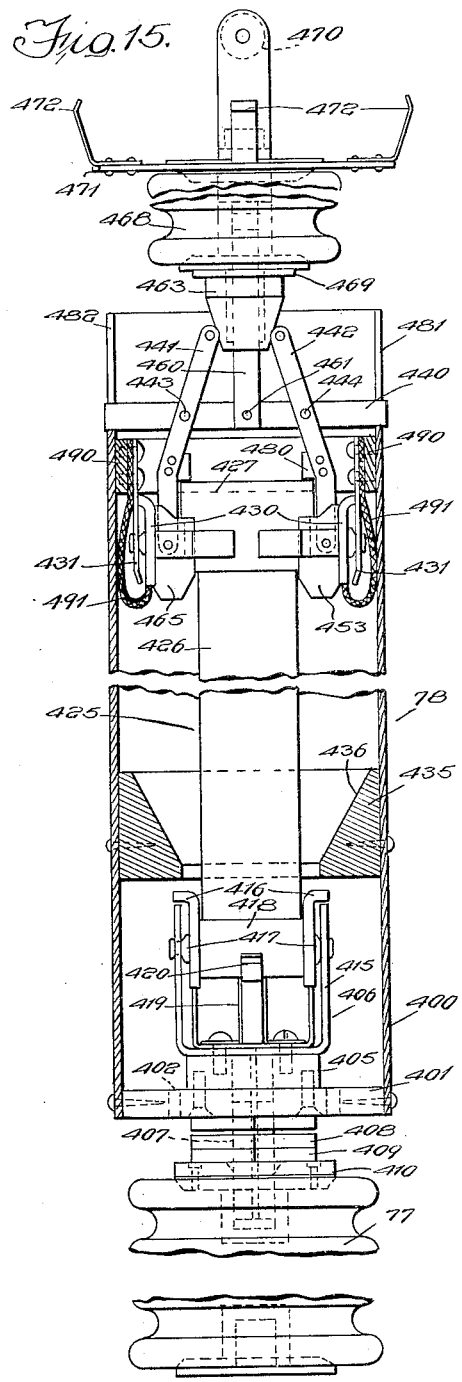
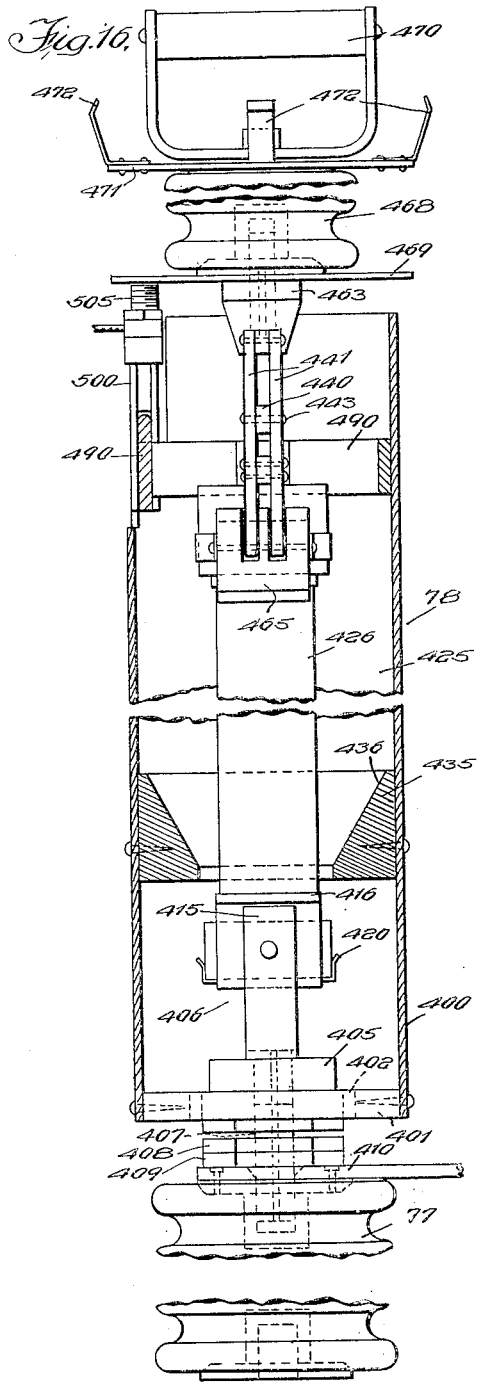
Witness:
William P. Kilroy
Inventor:
Ernst Blomquist
Brown, Jackson, Boettcher & Dienner
Attys

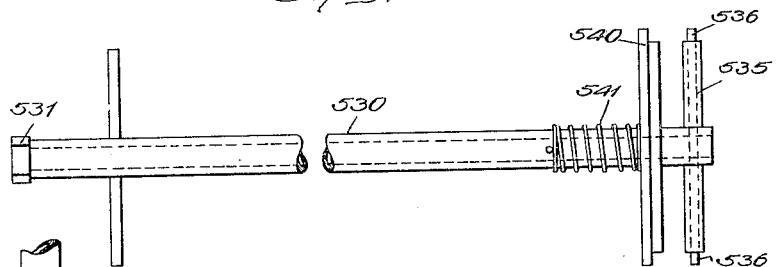
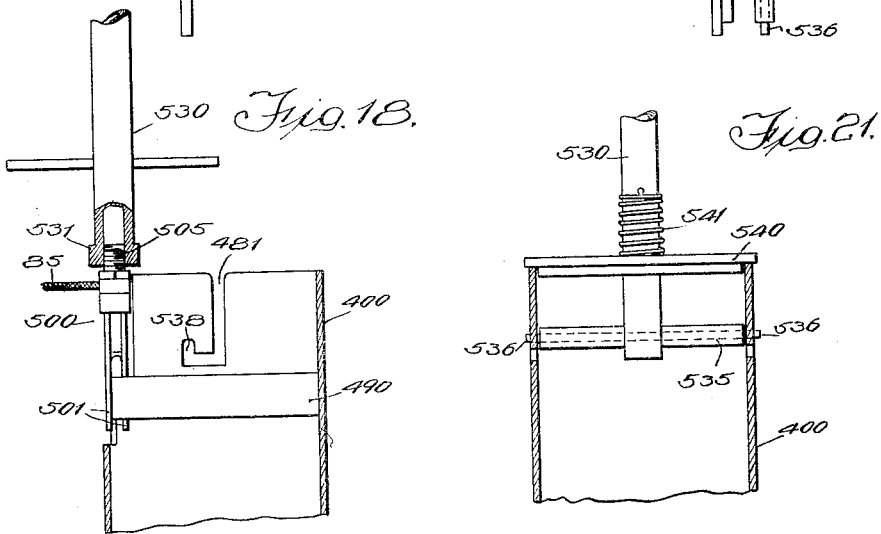
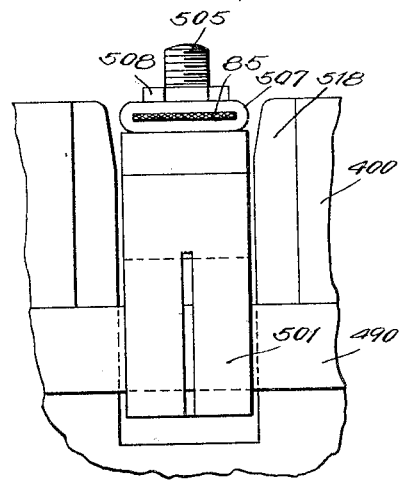
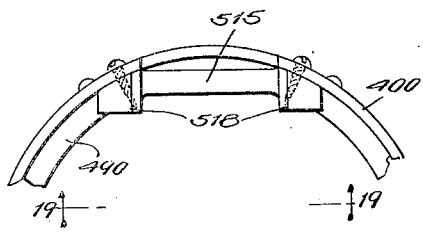

May 16, 1933.  E. BLOMQUIST  1,908,815
TRANSFORMER SELECTOR CABINET
Filed May 27, 1929   13 Sheets-Sheet 13
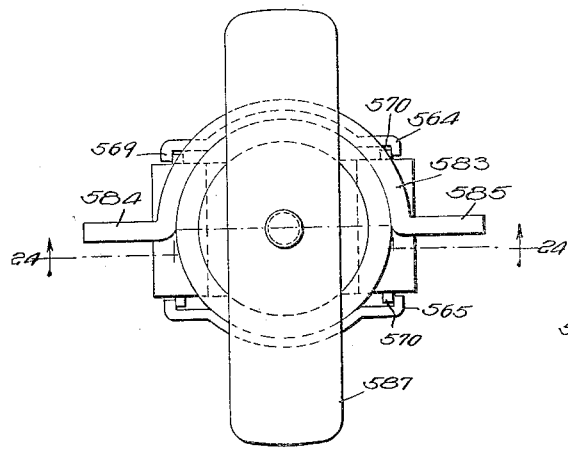
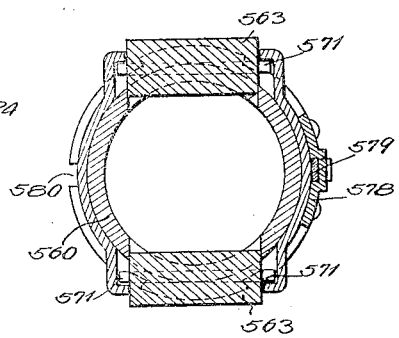
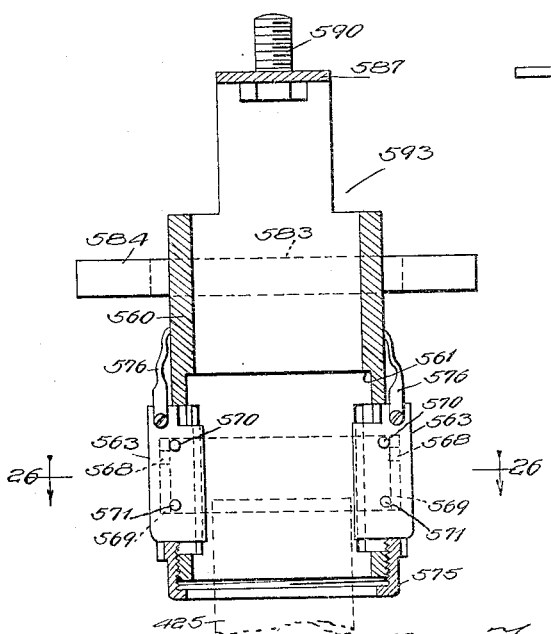
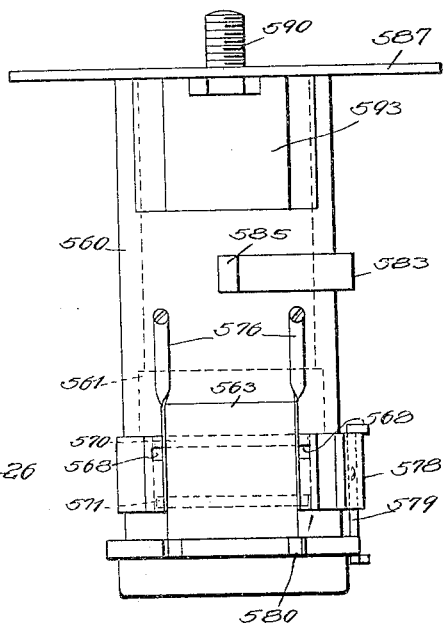
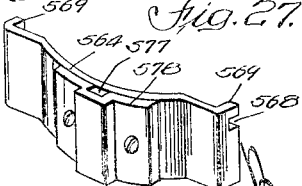

Patented May 16, 1933

1,908,815

UNITED STATES PATENT OFFICE

ERNST BLOMQUIST, OF LOMBARD, ILLINOIS

TRANSFORMER SELECTOR CABINET

Application filed May 27, 1929. Serial No. 366,273.

This invention relates to electric systems and more particularly to distribution centers in high voltage systems. The function of a distribution center is to receive electric power from a remote source, step or transform it to a voltage suitable for local distribution, and provide suitable tapping connections or busses from which the feeder lines may extend.

This invention relates more particularly to the switching means for substituting a spare transformer for one of the transformers in the main transformer bank, and it is one of the objects of the present invention to provide a switching cabinet for enclosing those switches. I provide a cabinet having an oil bath for the switches on the high voltage side of the transformer bank, thus permitting the use of smaller and cheaper switches than would otherwise be necessary since switches of the type designed for outdoor service if immersed in an oil bath may be used on voltages appreciably higher than that for which they were designed, without any sacrifice in the degree of safety provided.

The switches on the high tension side of the transformer bank are enclosed in an oil tank and the switches on the low tension side of the transformer tank are also enclosed in a tank but are not immersed in oil. The means for operating the switches extends outside of the respective tanks and is fully enclosed adjacent each of the switches. In view of the fact that all of the switching equipment is enclosed, I have provided an interlock arrangement to prevent the inadvertent operation of the wrong switch and also have provided an indicator for showing the position of the respective switches. The interlock between the transformer selector switches is so arranged that any faulty transformer can be replaced by a spare transformer by first turning the interlock indicator to the proper position to release the switches controlling the particular faulty transformer to be replaced, which operation releases the switches on the high tension side and on the low tension side of the particular transformer. The released switches may then be pushed into the downward position which operation automatically disconnects and grounds the windings of the faulty transformer and connects the spare transformer in its place. The interlock indicator will also serve to indicate which transformer is disconnected. The interlock is so arranged that it is impossible to gain access to any of the switches until the circuit through the transformer bank has been opened at another point, thus rendering operations at the switches perfectly safe. The interlock not only prevents operation at the switches but also prevents the touching of the switch handles of the transformer selector switches until the circuit through the transformers has been opened.

A cover is provided above each switch and to operate the switches the cover must be opened and the switches are then operable by means of an operating rod which is inserted through the open top. The interlock prevents opening the cover above any of the switches until the circuit through the transformer bank has been opened at another point.

I contemplate mounting the fuses which are on the high voltage side of the transformer bank within the oil cabinet, and it is one of the objects of the present invention to provide a fuse holder for receiving standard fuses, said holder being so arranged that the fuse may be inserted or removed without the necessity of putting one's hand into the oil within the cabinet.

One of the novel features of this invention lies in the manner in which the high voltage power conductors are extended into the oil cabinet. According to my invention, standard potheads are used, the pothead being mounted in an inverted position directly upon the oil cabinet. This provides a very simple and effective way for leading the conductors into the cabinet, avoiding the use of porcelain bushings such as are used in standard practice upon high voltage transformers.

The attainment of the above and further objects of the present invention will be apparent from the following specification taken in conjunction with the accompanying drawings forming a part thereof:

In the drawings:

Fig. 3 is a view taken along the line 3—3 of Fig. 2;

Fig. 4 is a sectional view through the high voltage oil switching cabinet, said view being taken along the line 4—4 of Fig. 6, the interlocking mechanism being omitted;

Fig. 4A is a plan view of the switching cabinet of Fig. 4 with the cover removed;

Fig. 5 is a sectional view taken along the line 5—5 of Fig. 4;

Fig. 6 is a top view of the switching cabinet with the covers of the sleet hood removed, said view being taken along the line 6—6 of Fig. 7;

Fig. 7 is a section taken along the line 7—7 of Fig. 6;

Fig. 8 is a fragmentary sectional view taken along the lines 8—8 of Fig. 3;

Fig. 9 is a fragmentary sectional view taken along the lines 9—9 of Fig. 3;

Fig. 10 is an enlarged top view taken along the line 10—10 of Fig. 7;

Fig. 11 is a section taken along the line 11—11 of Fig. 10;

Fig. 12 is an enlarged view of the interlocking control lever shown in Fig. 6;

Fig. 13 is a sectional view through the switching cabinet on the low tension side of the transformer bank, said view being taken along the line 13—13 of Fig. 14;

Fig. 14 is a sectional view taken along the line 14—14 of Fig. 13;

Fig. 15 is a longitudinal section taken through the fuse and fuse holder on the high voltage side of the system;

Fig. 16 is a longitudinal view through the same fuse holder, said view being taken at right angles to the section of Fig. 15;

Fig. 17 is a fragmentary perspective view of a portion of the chuck mechanism for gripping the upper ferrule of the fuse;

Fig. 18 is a fragmentary view showing the manner in which the contact clip is removed from the fuse holder;

Fig. 19 is a fragmentary elevational view taken along the line 19—19 of Fig. 20;

Fig. 20 is a fragmentary plan view of a portion of the fuse holder, showing the contact ring engaged by the contact clip;

Fig. 21 is a view showing the manner in which the fuse holder is engaged by the gripping tool for removing the fuse holder from the oil tank;

Fig. 22 is a view of a tool used for inserting or removing the fuse holder from the oil tank;

Fig. 23 is a top view of a portion of a modified form of fuse holder;

Fig. 24 is a section taken on the line 24—24 of Fig. 23;

Fig. 25 is a side view of the fuse holder;

Fig. 26 is a section taken along the line 26—26 of Fig. 24; and

Fig. 27 is a perspective view of a clip used in connection with this form of fuse holder.

Figure 1:
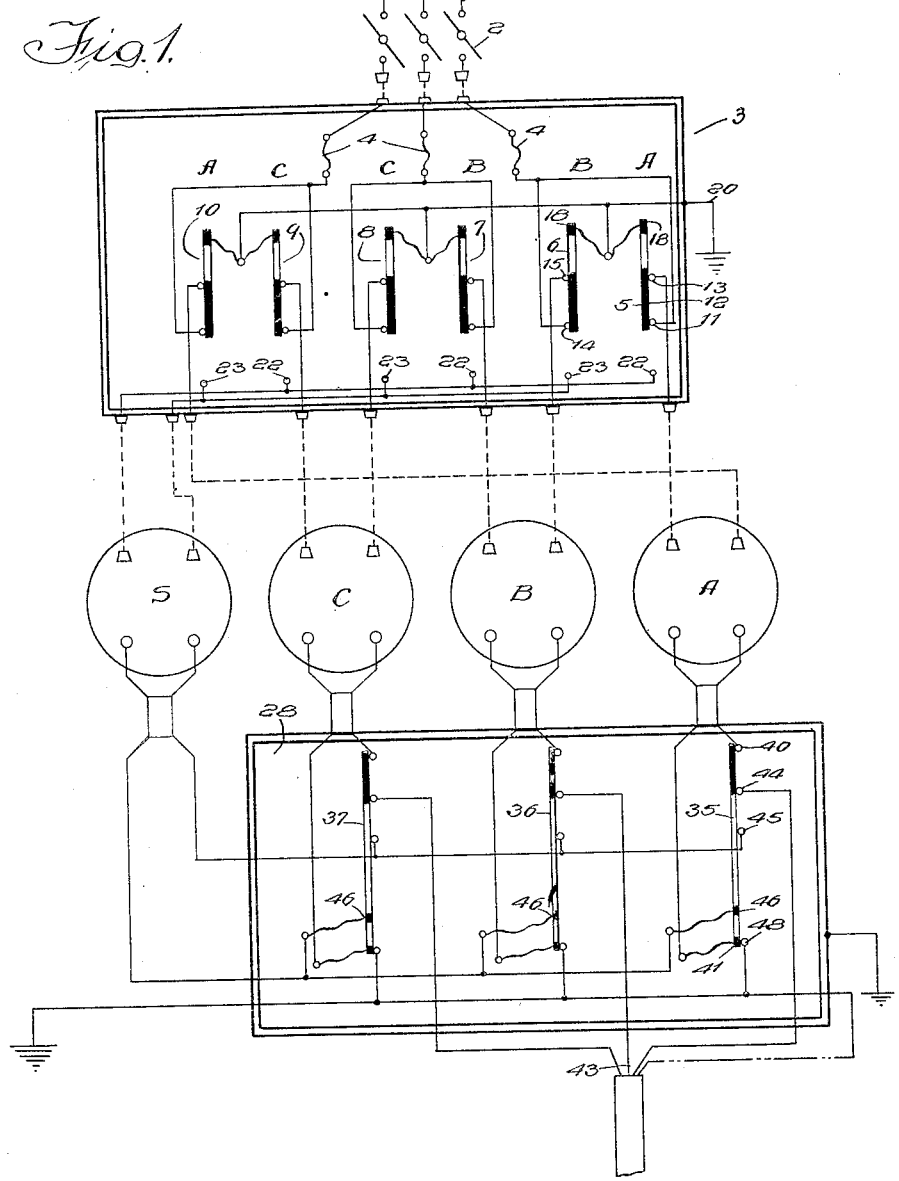
Fig. 1 is a simple diagram of the connections at the switching center.

In order to facilitate an understanding of the arrangement of the parts within the switch and fuse cabinet and the function of the various parts, reference may be had first, to Fig. 1, showing in diagrammatic form a circuit diagram of the connections at the distribution center. An incoming line 1, which is assumed to be three phase and 33,000 volts extends through the air break switches 2 to the fuse and switching cabinet 3. It is, of course, understood that the incoming line may be of any other number of phases or at any other voltage. The line conductors extend through the fuses 4 mounted within the oil cabinet 3, thence to the six bayonet type switches indicated at 5 to 10 inclusive. There are two switches provided for each of the A, B, and C phase transformers as indicated in Fig. 1. The shaded part of each of the switches 5 to 10 inclusive indicates the conducting portion of the switch whereas the unshaded part indicates the insulating portion. The circuit from one of the line phase conductors extends from the fuse 4 to the terminal 11 of the switch 5, thence through the conducting segment 12 of that switch to the terminal 13 which is connected to one pole of the A phase transformer. A connection from the same fuse 4 extends to the terminal 14 of the switch 6 and by way of the conducting portion of the switch 6 to the terminal 15 which extends to one pole of the B phase transformer.

Likewise, other line conductors 1 extend through the other switches to the B and C phase transformers. The upper conducting portion 18 of each of the disconnect switches 5 to 10 inclusive is connected to the grounded conductor 20. The lowermost contact 22 of the alternate switches 5, 7 and 9 are connected to one pole of the spare transformer and the similar lowermost contact 23 of the alternate switches 6, 8 and 10 are connected to the opposite pole of the spare transformer. When the switches are in the position indicated, the A, B and C phase transformers are connected in circuit with the high voltage line 1 and the spare transformer is disconnected from the circuit.

The conductors from the secondary or low voltage side of the transformer bank extend to the switching cabinet 28. Within the cabinet 28 are mounted three bayonet type disconnect switches 35, 36 and 37 of a somewhat similar construction to the switches mounted in the cabinet 3. The conductors from the A phase transformer extend to the upper terminal clip 40 and the lower conducting section 41, respectively, of the disconnect switch 35. One of the three outgoing feeder conductors 43 is connected to the terminal clip 44 of the A phase switch 35. The other two outgoing feeder conductors are connected to the corresponding clip of the other two switches 36 and 37. The clips 45 of the three switches are connected together and extend to one pole on the secondary side of the spare transformer S and the other side of the spare transformer is connected to the conducting portions 46 of each of the switches 35, 36 and 37.

With the switches in the position shown, the A, B and C phase transformers are connected in circuit. To replace one of those transformers by a spare transformer, it is necessary to depress the corresponding switches on the high voltage side of the transformer bank and the one corresponding switch on the low voltage side. If it is desired to replace the A phase transformer by the spare S, the switches 5 and 10 within the switching cabinet 3 are depressed as is also the switch 35 within the cabinet 28. The depression of the switch 5 causes the conducting section 12 thereof to bridge the contacts 11 and 22 thus connecting one pole of the spare transformer to the transmission line, and it connects the conducting section 18 which is grounded to the terminal clip 13, thus grounding one side of the A-phase transformer. In a like manner the disconnect switch 10 connects the other side of the spare transformer to the transmission line and grounds the other terminal of the A phase transformer. On the secondary side of the transformer bank, the depression of the disconnect switch 35 disconnects the terminal 41 from the terminal 48 which is connected to the neutral of the system and instead connects the portion 46 thereto, said portion being connected as previously stated to one side of the secondary of the spare transformer.

The uppermost conducting portion of the switch 35 which previously bridged the terminals 40 and 44 now bridges the terminals 44 and 45 thereby connecting the opposite pole of the spare transformer to the outgoing feeder conductor which is connected to the terminal 44 and at the same time disconnecting the opposite side of the secondary of the A phase transformer from the circuit.

Figure 2:
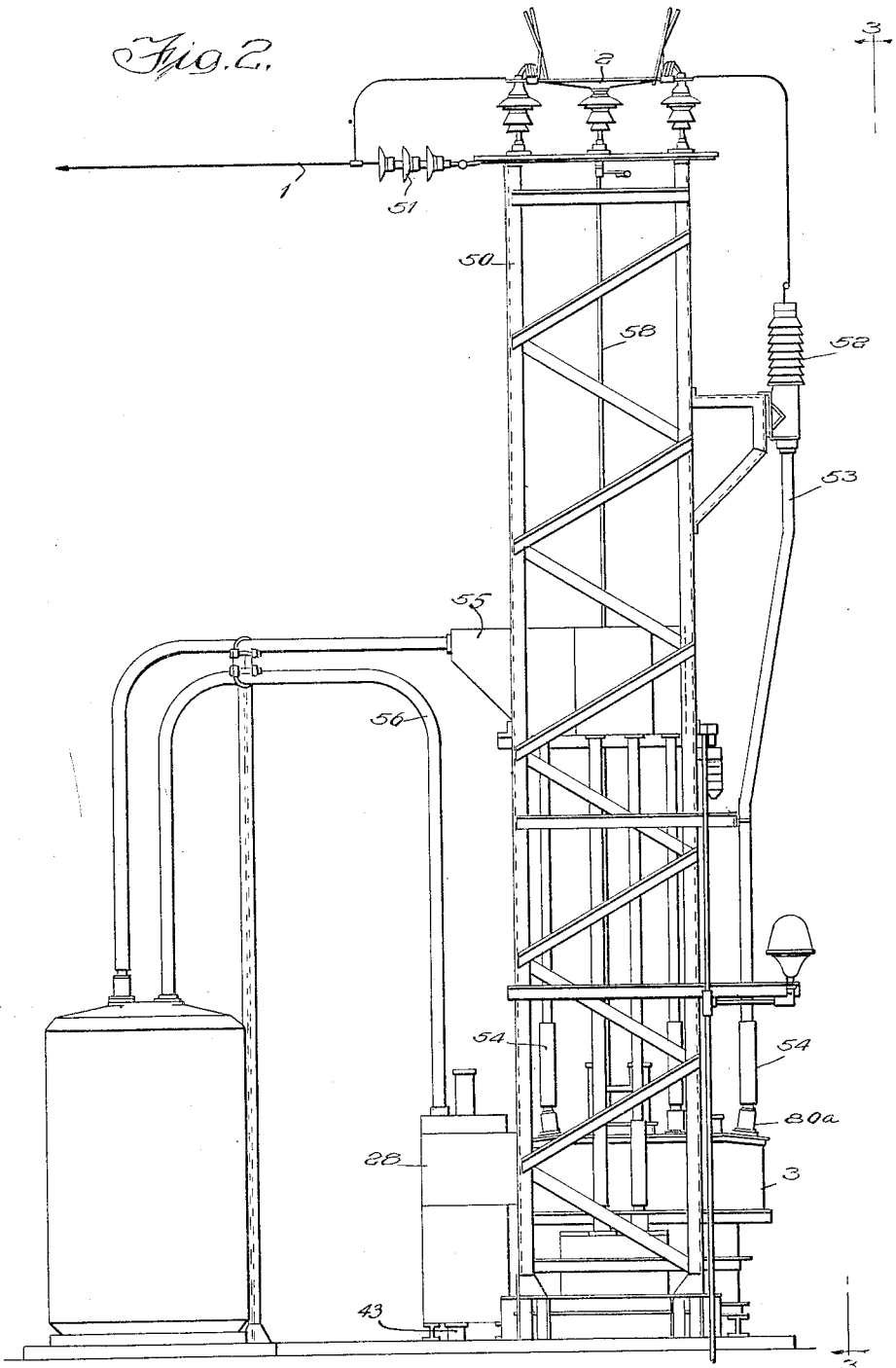
Fig. 2 is a side elevation of the enclosed feeder installation.
Figure 1A:
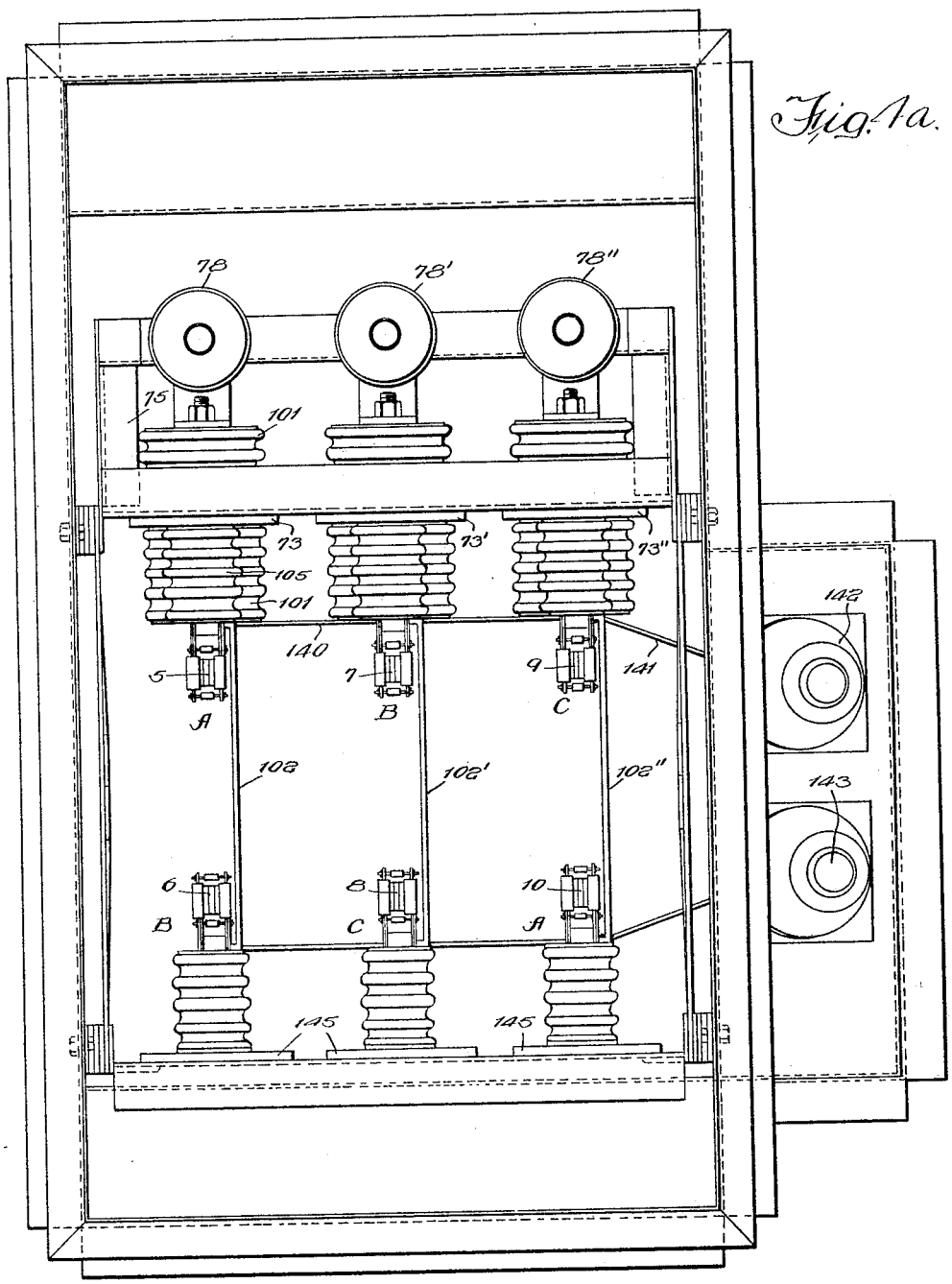

Reference may now be had to Figures 2 and 3 showing the physical layout of the transformer bank, the transmission tower and the switching cabinet. The incoming transmission line 1 terminates at the tower 50, being supported therefrom by the insulators 51. Each of the line conductors extends to an air break switch 2 mounted on top of the tower and from the switch it extends through a pothead 52 into a conduit 53 which extends to the switch and fuse cabinet 3 to be presently more fully described.

The conduit 53 terminates a short distance above a pot head 80a which is mounted in an inverted position at the top of the tank 3 and extends into the tank. Connections from the incoming line 1 extend into the switching tank 3 by way of the pot heads. A pipe sleeve 54 is slidable upon the conduit 53 and protects the lower end of the cable adjacent the top of the pot head.

The outgoing conductors from the cabinet 3 extend in single conductor conduits to a pull box 55 and from the pull box extend in single conductor conduits to the high voltage side of the transformers. At the transformer bank, the bushings ordinarily present are removed and, on the high voltage side pot heads are substituted, the pot heads being mounted in an inverted position. The lead in conductors are extended through the pot heads and are connected within the transformer to the high voltage winding. On the low voltage side, the bushings usually provided are likewise removed and one of the openings plugged up. Both conductors extending from the low voltage winding extend from the respective transformers in two conductor conduits indicated at 56 to the selector cabinet 28. The outgoing feeder 43 extends from the cabinet 28 preferably underground. The disconnect switches 2 at the top of the tower are gang operated in the usual manner, an operating pipe 58 extending downward to the base of the tower and being rotated by a handle 59 to bring about the rotation of the switch blades.

An interlocking rod 62 connects the operating pipe 58 with the interlocking mechanism for the switches within the cabinet 3 in a manner to be presently described more fully.

Reference may now be had to Figures 4, 5, 6 and 7 showing the construction of the switch and fuse cabinet 3 and the switches and interlocking mechanism therefor. The switching cabinet 3 is made of sheet metal and is mounted upon suitable beams 65. The tank is made of sheet steel being suitably reinforced at the corners by means of angle beams 68. Two horizontal cross bars 71 and 72 (Fig. 5) are mounted within the oil tank and support the panels 73, 73' and 73'' upon which the switch contacts are mounted. A lower bracket 74 and an upper bracket 75 (Fig. 4) are secured to the rear side of the panel section 73 and support an insulator 77 supporting a fuse holder 78.

The fuse 4 of Fig. 1 is mounted within the fuse holder 78. Brackets similar to 74 and 75 are mounted at the rear of each of the panels 73' and 73'' for supporting insulators 77 for the other two phases of the system. The structure of the fuse holder 78 is shown more particularly in Figs. 15 to 20 to be more fully described as the specification proceeds. The lead in conductors from the power line extend into the oil switching tank through inverted pot heads as previously stated.

The pothead 80a for one of the phase conductors is indicated in Fig. 4. The pothead is secured to the upper portion of the oil tank by means of suitable bolts extending through flanges indicated at 81. The portion 82 of the pothead is the portion which in the usual use of potheads extends in an upward direction. The lead covered cable 83 extends into the potheads and at the lower end a connection is made to the copper conductor within the cable and a flexible lead indicated at 85 is secured thereto. A clip 86 of bar copper is also secured to the lower end of the pothead for a purpose to be more fully explained hereafter. The sheet metal case or cabinet is provided with an opening 90a above each of the fuse holders 78 for permitting the insertion or removal of the fuses. A pipe section 91 is mounted upon the top of the cabinet adjacent each of the openings and there is provided a hinged cover 92 hinged at 93 for permitting access to the fuse. A conductor 100 extends from the lower terminal of the fuse holder 78 through the hollow insulator 101 to the terminal clip 11 of the A phase switch 5. A conductor 102 comprising a copper bar connects the terminal 11 with the terminal 14 of the B phase switch 6. The conducting section 12 of the switch 5 is adapted to electrically connect the terminal 11 with the terminal 13 when the switch is in the position shown in Fig. 4 or to connect the terminal 11 with the terminal 22 when the switch blade is depressed.

The switch terminal clip 13 is mounted on an insulator 105 which is secured to the panel section 73, and the lower terminal clip 22 of the switch 5 is supported by an insulator 106 which is mounted upon the panel 73 at the lower end thereof. A flexible conductor 107 connects the upper terminal clip 13 to the lower terminal 108 of a pot head 109. The pot head 109 is of standard construction and, like the pot head 82, it is mounted in an inverted position. A lead sheathed cable 110 extends outward from the pothead to one terminal of the A phase transformer thus establishing an electrical connection between the terminal clip 13 and the A phase transformer.

The switch 5 comprises a strip of micarta or other suitable insulating material 115 which extends the entire length of the switch. Contact strips of copper or other suitable conducting material are secured to the insulating strip 115 at the opposite sides thereof as indicated at 116. The contact strips 116 are of a length sufficient to bridge the gap between the contacts 11 and 13 or between the contacts 11 and 22. Contact strips 118 similar to the contact strips 116 are secured to the insulating material 115 at a point above the contact strips 116 by an amount slightly less than the full extent of travel of the switch blade in the downward direction when the same is pushed so that the contact strips 116 lie between the contact 11 and the contact 22.

When the switch 5 is depressed so as to establish a circuit between the contacts 11 and 22, the bare insulation 115 lies between the contacts 11 and 13 and the contact strips 118 are in engagement with the contact 13. A flexible conductor 120 is connected between the contact strips 118 which contact strips extend to the top of the micarta insulation 115, and connects the contact strips 118 to ground. The flexible conductor 120 connects the copper strips 118 with a grounded copper conductor 121 which extends through the switch cabinet. The bar 115 with the strips 118 on the opposite sides thereof extends upward through an opening in the top of the casing and has a small hole 125 formed therein for manipulating the switch, the upper end being enclosed in a pipe 126 provided with a cover 127 hinged at 128. To manipulate the switch the cover 127 is swung to the open position and a hook at the end of a suitable operating pole is inserted into the opening 125 and the switch is forced downward or upward as the case may be for manipulating the switch.

The contacts 11, 13 and 22 may be of any desired construction and preferably consist of two spring pressed jaws indicated more particularly at 130 in Fig. 5. The switch blade is adapted to slide between the spring pressed contact jaws 130 and a suitable hook or bale 131 is provided at each of the pairs of jaws for retaining the blade between the jaws.

When the switch 5 is depressed, a connection is established from the terminal 11, which is connected to the incoming line, to the terminal 22, which, as will be pointed out hereafter, is connected to one side of the spare transformer. At the same time the contact portion 12 interrupts the connection between the contacts 11 and the contact 13 and the grounded conducting portion 119 comes into engagement with the contacting portion 13 thereby grounding one side of the transformer.

The three incoming line conductors 1 for the three phases extend into the switching cabinet through potheads such as the potheads 80a and extend through fuses on mountings 78′ and 78″ similar to the fuse mounting 78 shown in Fig. 4 and then the B and C phase conductors extend to the switches 7 and 9 of a construction identical to the construction of the switch 5. The switch 6, which is opposite of the switch 5, has a flexible conductor extending from its upper terminal clip 15 establishing a connection to a conductor which extends into the switch house through an inverted pothead 135 from which a connection is established to one pole of the B phase transformer.

As may be seen from Fig. 4a the switches 5, 7 and 9 which control the connections to one side of the A, B and C phase transformers, respectively, are mounted on one side of the switching cabinet and the switches 6, 8 and 10, which are mounted on the other side of the switching cabinet, control the connections from the other terminals of the B, C and A phase transformers. The terminals 11 and 14 of the switches 5 and 6 are connected together by a copper bar 102 and the corresponding terminals of the switches 7 and 8 are connected together by a similar bar 102' whereas the corresponding conductors of the switches 9 and 10 are connected together by a bar 102".

The lower terminals 22 of each of the switches 5, 7 and 9 are connected together by a strip of copper 140 which is connected by means of a flexible conductor 141 to the lower end of the inverted pothead 142 from which a connection extends to one terminal on the high tension side of the spare transformer. In a like manner the lower terminals 23 of the three switches 6, 8 and 10 are connected by means of a flexible conductor to an inverted pothead as indicated at 143 in Fig. 4a, from which pothead a conductor extends to the other terminal on the high tension side of the spare transformer.

It may thus be seen that if the two switches 5 and 10 are depressed that the high tension side of the A phase transformer will be disconnected from the incoming line and will instead be grounded, whereas the two terminals on the high side of the spare transformer will be connected in place of the A transformer. In a like manner if the two switches 6 and 7 are depressed instead of the switches 5 and 10, the B phase transformer will be disconnected and the spare will be connected in its place. In a like manner the switches 8 and 9 control the establishment of connection for substituting the spare transformer for the C phase transformer. The switches 5 to 10 are mechanically interlocked so as to prevent manipulation of non-corresponding switches at the same time thereby preventing any attempted substitution of the spare transformer for more than one of the three transformers. The interlocking arrangement will be fully described as the description proceeds.

The switches 6, 8 and 10 are of a construction identical to the switches 5, 7 and 9 and the switch contacts for those switches are mounted on suitable panels 145 similar to the panel 73. The panels 73 and 145 are suitably braced by braces 146 and 147.

The switching tank is filled with a high grade insulating oil or other suitable insulating liquid to a level above the top of the fuse holder 78.

An explosion valve 148 is provided in the top portion of the switching cabinet, said valve comprising a pipe 149 of suitable diameter provided with a cover 150 hinged at 151 and maintained closed by a spring 152 which is adjusted to a suitable tension to maintain the cover closed until the pressure within the oil tank exceeds a certain limit whereupon the cover is forced open against the action of the spring. A fine mesh wire screen 155 is provided above the opening 148 to prevent the dropping of foreign material into the oil tank.

A description will now be given of the interlocking mechanism for interlocking the various selector switches 5 to 10 inclusive amongst themselves and with the operating mechanism for operating the pole top switches 2. As previously stated each of the disconnect switches is operated by first opening the cover 127 (Fig. 4) and then manipulating the switch by means of a suitable switch operating rod. As will be presently pointed out there are two forms of locking mechanism provided; one form of locking mechanism prevents the opening of the covers such as 127 when the pole top switch is closed and thereby prevents the manipulation of the selector switches, and a second interlock is provided for preventing the inadvertent manipulation of the wrong disconnect switches. A description will first be given of the apparatus for locking the covers 127 to prevent inadvertent manipulation of the switches when the pole top switches 2 are closed, and for this purpose references may be had to Figs. 6, 8 and 9.

A rotatable pipe 62, which controls the locking of the covers 127 extends from the switching cabinet to the operating member 58 (Fig. 3) that operates the pole top switches. A clevis 160 is suitably secured to the vertically extending operating pipe 58 and is adapted by means of a rod 161 to rotate the clevis 162 secured to the pipe or rod 62. The member 161 extends to an enlarged opening 165' in the clevis 162 and upon the rotation of the member 58 (Fig. 9) causes the rotation of the member 62. The pipe 62 extends to the selector switching cabinet and is supported in a suitable bearing bracket 165 secured to the end pipe member 126 (Fig. 6) and another and similar bracket 166 secured to the foremost pipe section. A cover 168 is mounted on the pipe section 62 and is freely rotatable with respect thereto. The cover 168 is adapted to be manually swung into position above the pipe 126 to close the same, a pair of wing nuts being suitably secured to the pipe section 126 and provided in order to securely hold the cover in position. The wing nuts are indicated at 169 and 170 in Fig. 10. A locking lug 171 is rigidly secured to the pipe section 62 and, when the pipe section is rotated through an angle of 90° in a clockwise direction from the position shown in Fig. 11, the locking lug assumes a position immediately above the cover 168 and prevents opening of the cover.

When the pole top switch 2 is moved to the open position, the shaft 62 is rotated to bring the locking lug into the position shown in Fig. 11, thereby permitting the opening of the covers 168 as desired. When the pole top switch is in the switch closed position, the shaft 62 is moved through an angle of approximately 90° thus bringing the locking lug 171 immediately above the cover 168 and preventing the opening of the cover; and thereby preventing manipulation of the selector switch. The covers 168 for the three switches 5, 7 and 9 are mounted upon the locking shaft 62, and the covers 175 of a construction identical to the covers 168 are in a like manner mounted upon a locking shaft 176 similar to the shaft 62. The locking shaft 176 has a crank arm 177 rigidly secured thereto and is connected to the shaft 62 by means of a link 178 and a crank 179 which is rigidly secured to the locking shaft 62 as may be seen in Figs. 6 and 7.

The covers 92 (Figs. 4 and 6) above the fuses are hinged to freely swing about a shaft 93 by means of two fork-like members 181 in the same manner as covers 168 and 175 are mounted to freely swing about their respective shafts. The locking lugs 183 are rigidly secured to the shaft 93 adjacent each of the covers and are adapted to be swung over the covers 92 to prevent opening of the covers, all in the same manner as does the locking lug 171 previously described.

A crank arm 182 is rigidly secured to the shaft 93 and is connected to the crank 179 mounted upon the shaft 62 by means of a rod 180. When the shaft 62 is swung to the position corresponding to the closed position of the pole top switch, the locking lugs 183 are above the covers 92 and prevent opening of those covers.

A description will now be given of the interlock provided between the various selector switches 5 to 10 for preventing the manipulation of more than one set of selector switches at a time. An interlocking lever 200 extends through the three pipe sections 126 housing the upper portions of the switches 5, 7 and 9, suitable openings being provided in the sides of the pipe sections 126 for the locking lever 200. The locking lever extends through all three of the pipe sections 126 and is housed in pipe sections 202 and 203 between the pipe sections 126, and in a pipe section 201 which enters the first one of the three pipes 126.

The upper portion of the blades 5, 7 and 9 is provided with a notch through which the locking lever 200 rides, the notch in the blade 5 being indicated at 205 in Fig. 11. When the locking lever 200 is out of the position shown in Figs. 10 and 11 the switch blade 5 cannot be depressed because the locking lever is within the notch 205 in the switch 5.

If the lever 200 is shifted in a manner to be presently more fully described, by an amount sufficient to bring the notch 206 into the space occupied by the notch 205 of the blade 5, it will be possible to depress the blade 5, said blade moving downward within the notch 206. When this has been done it is of course apparent that the blade 205 will retain the locking lever 200 in position preventing further movement of the locking lever until the blade has been restored to the position shown in Fig. 11. A notch 207 similar to the notch 206 is provided in the locking lever 200 adjacent the switch 7, the two notches 206 and 207 being spaced from the respective switches by unequal amounts so that one only of the two notches is immediately under the switch blade at a time. When the notch 206 is under the switch blade 5, the notch 207 is spaced from the blade 7 and the blade 7 cannot be depressed, whereas if the locking lever is moved a slight additional distance then the notch 207 will come immediately into position opposite the switch blade 7 thereby permitting manipulation of the switch 7, whereas the notch 206 will have moved beyond the switch blade 5 and the switch blade 5 is again held against motion. If the locking member 200 is moved still further then the notch 207 will advance beyond the switch 7 and that switch will also be locked against motion, whereas the end of the lever 200, that is adjacent the switch 9, will ride past the switch 9 thereby permitting manipulation of the switch 9.

In this manner, as is apparent, only one of the three switches 5, 7 and 9 can be manipulated at a time and when one of the switches is operated into the downward position the other two switches are held locked and likewise the interlock mechanism is also locked in its position.

A crank arm 220 pivoted at 221 is connected to the interlocking member 200 by means of a link 222 so that upon turning the crank arm 220 the locking lever 200 is shifted. An operating handle 225 is welded to the bell crank 220 or may be otherwise rigidly secured thereto so that when the operating handle 225 is actuated the bell crank 220 is turned with the result that the locking lever 200 is manipulated. A hand gripping member 225' is provided for actuating the handle 225.

An arcuate shaped plate 228 having four notches 229 therein is provided for accurately determining the position of the interlocking lever 200 from the position of the handle 225. A V shaped projection 230 is provided on the under side of the lever 225, said projection riding upon the arcuate shaped member 228. When the projecting member 230 rests in one of the notches 229, a corresponding notch in the lever 200 is opposite one of the switch blades, and there is provided a plate having the letters A, B and C marked thereon, the markings and the notches 229 being so spaced that when the lever handle portion 225' is in such a position that notches 205 or 207 or the end portion 200 adjacent the switch 9 are in positions such as to permit the operation of the switches 5, 7 or 9, with the projecting portion 230 resting in one of the notches 229, the handle portion 225' is opposite a portion of the plate having the letters A, B or C corresponding to the particular phase switch that is free to be operated.

The arcuate plate 228 is provided with an additional notch 230' and the name plate is provided with a letter "O" opposite the position of the handle when the handle rests at the notch 230'. This indicates that none of the selector disconnect switches 5, 7 or 9 can be operated.

The switches 6, 8 and 10 are provided with an interlocking lever 235 similar to the lever 200, said lever 235 being operated by a bell crank 236 connected to the bell crank 220 by means of a rod 237. When the handle portion 225' is shifted to a position opposite the indicating letter "A", the notch 206 in the lever 200 comes opposite the switch 5, whereas a corresponding notch in the lever 235 comes opposite the switch 8. Under these conditions the switches 5 and 8 may be operated, whereas switches 7, 9, 6 and 10 are held in a locked position. When the handle 225' is in the B position, the switches 7 and 10 are released whereas the other switches are held locked, and when the switch handle is in the C position, the switches 9 and 6 are released whereas the other switches are held locked.

As previously stated in connection with Fig. 1, the selector disconnect switches on the low tension side of the transformer bank are housed in a cabinet 28. The cabinet 28 as well as the switches therein are of a construction such as will be more fully set forth as the description proceeds. The cabinet 28 is located adjacent the cabinet 3 and the switches therein are provided with interlocks identical with the interlocks described in connection with the switches on the high tension side of the transformer bank. The covers 240 of a construction substantially similar to the covers 92, 168 and 175 are mounted upon a rotatable shaft 241 similar to the shaft 62, said shaft being provided with locking lugs 242 similar to the locking lugs 171 for preventing the opening of the covers 240. A crank 245 is secured to the shaft 241 and said shaft is connected by means of a connecting rod 246 to the crank 177, and by means of a connecting rod 178 to the crank 179 as shown more particularly in Figs. 6 and 7. When the pole top switch 2 is open, the lugs 242 are in a position to permit the opening of the covers 240 whereas when the pole top switch 2 is closed, the lugs 242 are immediately above the covers 240 and prevent the opening of the covers, all in the same manner as was previously described in connection with the covers on the high tension side of the switching cabinet.

The switches 35, 36 and 37 are interlocked by means of an interlocking member 250 of a construction similar to the lock member 200 and provided with notches in a similar manner. The locking lever 250 is connected to a bell crank 251, pivoted at 252, by means of a link 253 and a piston rod 254. A pipe section 255 encloses the piston rod 254, suitable packing being provided for preventing the escape of any lubricant that is introduced into the member 255 to reduce the friction therein. Similar piston rods and packings are provided for the members that operate the locking levers 200 and 235 on the high tension side of the switching cabinet. The notches in the locking lever 254 for locking and releasing the switches 35, 36 and 37, are spaced similarly to the spacing of the notches in the lever 200 and when the operating handle 225' is in the "O" position all three of the switches are locked whereas when the handle 225' is shifted to the "A" position the switch 35 is released, when the handle 225' is shifted to the B position the switch 36 is released and in the C position the 37 switch is released.

To replace any phase transformer with the spare it is merely necessary to set the interlock lever handle 225' on the position indicating the transformer to be replaced (A, B or C) and then to push the three switches (two on the high tension side and one on the low tension side) marked correspondingly into the "down" position.

The switches are of course pushed down by means of a switch hook.

To change back from the spare transformer to the corresponding phase transformer it is merely necessary to note the position of the interlock control lever 225' and then pull up the three switches with the corresponding markings into the upper position and thereafter set the interlock control lever 225' to the "O" position.

An interlock is provided for preventing the manipulation of the lever 225' from the "O" position to either the A, B or C position when the pole top switch is closed. A forked crank 260 is secured to the locking shaft 62 and controls the movement of a locking pin 261. The locking pin 261 is arranged to ride freely in a groove 262 in the crank 260 and is guided in suitable guides 263 and 264 secured to the pipe section 126 as may be seen in Fig. 7. When the pole top switch is in the open position, the crank 260 is in the position shown in Fig. 7 and the pin 261 is in its uppermost position. When the pole top switch is operated to the closed position the crank 260 is rotated in a clockwise direction as is seen in Fig. 7, thus allowing the pin 261 to drop downward into the path of movement of a lever 266 integral with the lever arm 225.

When the lever handle 225' is in the "O" position, the portion 266 is located to the right of the pin 261, the position of the arm 266 as seen in Fig. 12 is the position occupied when the arm 225' is in the "A" position, the dotted line position of the member 266 and 225 being the "O" position of the interlock control lever.

It is thus apparent that when the arm 266 is in the position shown in dotted lines in Fig. 12 which is the "O" position of the interlock, and when the pole top switch is closed the pin 261 is dropped downward into the path of movement of the arm 266 and the arm cannot be moved from the "O" position to the A, B or C positions until the pole top switch is opened thereby rotating the crank 260 and raising the pin 261 out of the path of travel of the arm 266. This is of importance for otherwise it might be possible to manipulate the handle 225' to the A, B or C position and leave it there without operating the corresponding switches. If the pole top switch were kept closed and service continued with one of the phase switches unlocked, it might happen that after a long period of time the switch that is unlocked would drift downward. The selector switches are not designed to open the circuit when there is current flowing therethrough and if the selector switch that was inadvertently left unlocked were to drop downward a dangerous and very destructive arc might be generated. The above described interlocking arrangement prevents such an occurrence.

A description will now be given on the selector switches on the low tension side of the transformer bank and for this purpose reference may be had to Figs. 13 and 14.

The switch cabinet 28 is constructed of sheet steel and is suitably supported by I beams 260 in any desired manner. Panels 261, 262 and 263, upon which the switches 35, 36 and 37 are mounted, are bolted or otherwise rigidly secured to a top angle beam 265 and to a bottom angle beam 266. The three panels are identical as are likewise the switches supported thereon. The switches 35, 36 and 37 are of the bayonet plunger type and are operated by an upward and downward movement of the switch blade. The blade proper consists of a strip of suitable insulating material of prerequisite mechanical strength and electrical insulating qualities needed, and in the present case comprises a strip of micarta insulation although any other suitable insulating material may be used. The micarta insulation is indicated at 265 and comprises a strip of a length extending the full length of the switch blade. Micarta insulation comprises nothing more than canvas impregnated with a phenol condensation product such as bakelite. Contact strips of copper or other suitable conducting materials are secured to the strip of insulating material 265 along the edges thereof at the desired points where contact is to be made between the various contacts as will be presently set forth. The switch 35 is adapted to slide between a number of sets of contact indicated at 270, 271, 272 and 273.

The contacts comprise a pair of jaws of copper or other suitable conducting material which are spring pressed against the switch blade so as to make good electrical contact therewith. A bail 275 between the jaws 270, and similar bails between the jaws of the other sets of the contacts are provided for preventing the switch blade 265 from shifting out of the jaws and at the same time maintaining the jaws together. The contacts 270 are mounted upon an insulator 277 secured to the panel 261. The other contacts 271, 272 and 273 are mounted upon similar insulators similarly secured to the panel. Two conductors 277' and 278 extend from the secondary or low tension side of the A-phase transformer to the switch cabinet 28. The conductors 277' and 278 extend to the switching cabinet 28 in a conduit 279. The conductors on the B and C phase transformers likewise extend to the cabinet in conduits 280 and 281 respectively, whereas the conductors from the secondary or low tension side of the spare transformer extend to the switch cabinet in a conduit 282. The conductors 278 extend through a clamp insulator 285 to a terminal clip 286 mounted on an insulator 287 at the lowermost end of the panel 261. A flexible conductor 288 connects the terminal on the insulator 287 with a pair of contact strips 290 secured to the opposite sides of the insulator section of the switch blade 35.

The contact strips 290 ride between the contacts 273 upon the insulator 295 when the switch 35 is in its uppermost position. When the switch 265 is moved downward the contacts 290 disengage with the contacts 273. The lower most contacts 273 of each of the three switches 35, 36 and 37 are connected together by a bar of copper or other suitable conducting material 292 and constitute the neutral of the system. The bar 292 has the neutral ground conductor 293 connected thereto and likewise has a conductor 294, which is the neutral of the system, connected thereto, said conductor 294 extending outward with the outgoing phase leads as will be more fully explained as the description proceeds. A pair of copper strips 300 are secured to the opposite side of the micarta insulation 265 of the switch 35 at a point between the contacts 270 and 271, said copper strips bridging those contacts when the switch is in the position as shown in Figs. 13 and 14. A conductor 301, which is one of the outgoing phase conductors, is connected to a terminal clip 302 which is permanently secured to the contact 271. When the switch 35 is in the position shown in the drawings a circuit is established from one terminal of the low tension side of the A phase transformer through the conductor 277' and contacts 270, thence by way of the conducting strips 300 to the contacts 271 to the outgoing phase lead 301.

The conductor 278, which is connected to the other terminal of the low tension side of the A phase transformer, is connected to the system neutral 292 by means of the flexible lead 288, contact strips 290 and contacts 273. Similar connections are established from the terminals of the B and C phase transformers. The three outgoing leads 301, 305 and 306 as well as the neutral 294 extend from the switching cabinet through a conduit 310 to the various points of distribution. A similar conduit 311 is provided to carry a set of conductors connected in parallel with the conductors within the conduit 310 should the capacity of the distribution center increase to such a point as to necessitate the replacement of the transformer bank by another bank of a larger capacity. The strip of insulation 265 of the switch 35 extends upward through the top of the cabinet 28 into a pipe 315 and adjacent the top thereof within the pipe it is provided with means for permitting an operating hook to grip the same. This means may comprise a hole such as the hole 125 in the switch 5 shown in Fig. 4. To substitute the spare transformer for the A phase transformer, the cover 240 of the pipe 315 is opened, the pole top switch 2 (Fig. 1) having been previously opened to permit the opening of the cover 240 as has been previously pointed out, and the switch 35 is pushed downward by means of a suitable operating hook, the interlock mechanism previously described having been set to the A position. When this is done the upper insulating portion of the switch 35 moves between the contacts 270, thus disconnecting the conductor 277 from the circuit.

At the same time the conductor strips 300 move downward thereby bridging the gap between the contacts 271 and 272. At the same time a pair of contacts comprising contact strips 320 move downward between the contacts 273. One of the leads 325 from the spare transformer is connected to a bar of copper or other suitable material indicated at 326, which bar is connected to each of the contacts 272 of the three switches, 35, 36 and 37 by means of suitable clips indicated at 327. When the conducting portions 300 of the switch 35 are moved downward they bridge the gap between the contacts 271 and 272 and thereby establish a circuit between the outgoing phase conductor 301 and the contact bar 326 which is connected to one terminal of the spare transformer. A conductor 330 extending from the other terminal of the low tension side of the spare transformer is connected to the copper bar 331 which is connected to the contact strips 320 by means of flexible conductors or leads 332. Similar flexible conductors connect the copper bar 331 with the contacts corresponding to the contacts 320 of the switches 36 and 37. When the switch 35 is depressed, the contacts 320 extend into engagement with the contacts 273 thereby establishing a connection between the bar 331, which is connected to one terminal of the spare transformer, and the bar 292 which is connected to the conductor 294 constituting the neutral of the outgoing distribution line.

It is thus apparent that by depressing the switch 35 the A phase transformer is disconnected from the circuit and the spare transformer is connected in its place. In a like manner a depressing of the switch 36 or 37 will substitute the spare transformer for the B or C phase transformers. The switches being interlocked by mechanism previously described in connection with Fig. 6, it is apparent that it is impossible for an operator to actuate more than one of the three switches at a time. The copper bar 331 is mounted to the side walls of the switching cabinet, being secured in place by means of insulators indicated at 341 and 342 in Fig. 13.

As may be seen from Figs. 6 and 7, sleet hoods are provided for protecting the interlocking mechanism at the top of the switching cabinet from ice and sleet accumulating thereon and interferring with or preventing the operation of the interlocking mechanism. Each of the sleet hoods comprises merely a sheet metal housing secured above the interlocking mechanism. The sleet hood 350 covers the locking mechanism for the covers 92 above the fuses in the high voltage switching cabinet, whereas the sleet hood 351 covers the switch locking mechanism on the high voltage switching cabinet. The sleet hood 352 covers the interlocking mechanism on the low voltage switching cabinet. Each of the sleet hoods is provided with a hinged cover indicated at 352', 353 and 354 for permitting access to the covers 92, 168, 175 and 240.

A hinged door (not shown) is provided at the front of the sleet hood 351 for permitting access within the sleet hood to operate the interlock actuating arm 225. The connecting rods, such as the rod 180 and 246 between the respective sleet hoods, are covered by inverted channel shaped troughs for preventing the formation of ice and sleet upon the connecting members. To manipulate the switches or the high tension fuses, it is of course necessary to first open the covers on the respective sleet hoods.

Reference may now be had to Figs. 15 and 16 showing the construction of the fuse holder 78 of Fig. 4. The fuse holder comprises a tube 400 of micarta or other suitable insulating material wherein are mounted the contacts for engaging the fuse. A fiber disc 401 is secured to the bottom of the tube 400, said disc being provided with a number of spaced holes 402 therein for permitting the passage of insulating oil from the tank wherein the fuse holder is mounted into the tube 400, and when the tube is being removed from the tank to permit the drainage of the oil from the tube. A block 405 is screwed to the fiber disc 401 on the inside of the tube and supports a suitable contact assembly 406. A threaded spindle 407 is secured to the block 405 and extends outwardly therefrom. A pair of lock nuts 408 and 409 are threaded onto the spindle 407 and the spindle 407 is threaded into the supporting insulator 77.

The lock nuts are tightly locked upon the spindle and are adjusted to such a position as to accurately fix the extent to which the spindle may be turned into the insulator 77. The insulator 77 is provided with a metal cap 410, which extends into the insulator and is cemented therein, said metal cap being internally threaded to receive the spindle 407. The insulator 77 is mounted in the oil bath in the switching tank shown in Fig. 4 and more fully described previously.

The contact 406 comprises a U-shaped spring supporting contact member 415 supporting a pair of contacts 416 by means of a swivel support 417 that permits a free swiveling movement of the contacts. The contacts 416 are adapted to receive the ferrule of a Schweitzer & Conrad fuse between them. The ferrule 418 of the fuse is a metallic cylindrical member having flat contacting surfaces on the opposite side thereof for engagement by the contacts 416. An upstanding lug 419 limits the downward movement of the lower end of the fuse ferrule and a spring member 420 is provided for additionally guiding the lower end of the ferrule. As previously stated the fuse 425 is a standard Schweitzer & Conrad type of fuse although the invention is not limited to such a type of fuse and it is understood that any other form of fuse may be used. The fuse comprises a glass tube encasing the fusible element, said fuse being filled with a suitable arc quenching insulating liquid such as carbon tetra-chloride or the like, the fuse element within the tube 426 being connected at the lower end to the metallic ferrule 418 and at the upper end to a metallic ferrule 427, said ferrules constituting the means for establishing a circuit through the fuse.

At the upper end of the tube 400 is mounted a pair of spring pressed contacts 430 each supported by a spring member 431 so as to have freedom of motion to adjust itself into proper engagement with the outside of a chuck member that holds the upper ferrule 427 in a manner to be presently described.

The fuse 425 is mounted in the chuck and is then inserted through the top of the fuse holder 78 until the lower ferrule 418 is engaged by the contacts 416 at which time the chuck will be engaged by the contacts 430 thereby establishing a circuit through the upper ferrule. A ring 435 of suitable insulating material is provided for guiding the end of the lower ferrule 418 into the contacts 416. The ring 435 is in this instance made of suitably treated maple wood and is provided with a conical opening 436 for guiding the ferrule.

A description will now be given of the chuck for gripping the upper ferrule 427 of the fuse. A bar 440 has a pair of clamping jaws 441 and 442 pivoted to it at 443 and 444 respectively. The jaws 441 and 442 are identical and each comprises a pair of similar members 445 and 446 rigidly secured together in spaced relationship by rivets 447 and 448. The lower ends of the two jaw members 445 and 446 extend into notches 450 and 451 in a contact jaw 453 which may be of brass or any other suitable conducting material.

A pin 454 extends through the contact jaw and pivotally connects the contact jaw with the lower portions of the members 445 and 446. A bolt 460 is slotted at its lower end and pinned to the member 440 by means of a pin 461, a limited amount of angular motion between the members 440 and 460 being permitted. A cone member 463 having a central bore therein is keyed on to the bolt 460 and is freely slidable upon the bolt. It is apparent from Figs. 15 and 17 that if the cone member 463 is forced downward, it forces the upper ends of the jaws 441 and 442 apart, thus causing the lower ends of those jaws, that is the ends whereon the contact jaws 453 and 465 are mounted, inward. The upper ends of the bolt 460 is screw threaded and extends into an insulator 468 which is provided with a central metallic plate extending therein and internally threaded. As previously stated, the cone 463 is freely slidable along the bolt 460 and therefore as the insulator 468 is turned downwardly upon the bolt, it forces the cone member downward, thereby forcing the upper ends of the arms 441 and 442 outwardly and the lower ends of those arms inwardly. A handle 470 is rigidly secured to the top of the insulator 468, a metallic plate 471 being interposed between the handle 470 and the insulator. The plate 471 has a number of spring metal contacts 472 secured to the top thereof, said metal contacts being provided in order to ground the upper portion of the insulator when the fuse holder is in position within the tank as will be presently described.

When the fuse holder 78 is immersed in the oil tank, the fuse may be inserted into the fuse holder as follows:

With the handle portion 470 and the accompanying insulator and chuck mechanism outside of the switching tank, the handle 470 is turned with respect to the bolt 460 to permit the conical member 463 to be drawn back and thereby permit the upper ends of the chuck jaws 441 and 442 to be drawn together and spread the lower ends of the chuck. A fuse is then inserted between the jaws 453 and 465 so that those last mentioned jaws engage the upper ferrule 427 of the fuse. Stops 480 limit the extent to which the ferrule 427 may be inserted between the jaws. The fuse 425 herein used has a ferrule 427, the end of which is cylindrical and has two beveled portions on opposite sides presenting flat surfaces to the jaws 453 and 465. The insulator 468 is then turned about the bolt 460 thus forcing the cone 463 downward between the upper ends of the jaws 441 and 442, thereby forcing the contacts 453 and 465 into a firm engagement with the flat ends of the ferrule 427. The chuck with the fuse 425 firmly held therein is then gripped by the handle 470 and inserted through the open cover 92 (Fig. 4) of the oil tank, above the fuse holder, into the fuse holder. The fuse 425 descends into the fuse holder until the lower ferrule 418 is pushed between the spring pressed contact jaws 416 held at the bottom of the fuse holder.

The fuse is now in position in the holder and the cover 92 above the fuse holder may be closed. As previously stated, the lower ferrule 418 is cylindrical and is planed off to provide flat surfaces on the opposite sides thereof for engagement by the contact jaws 416. It is therefore necessary that the fuse be inserted into the holder with the flat surfaces of the fuse disposed in such a position as to engage the contacts 416. To insure the proper disposition of the flat surfaces of the ferrule with respect to the contacts 416 when the fuse is being lowered into the fuse holder, the shell 400 of the fuse holder is provided with two oppositely disposed slots 481 and 482 at the upper end thereof. When the chuck and the fuse held therein are lowered into the fuse holder the bar 440 must pass downward into the slots 481 and 482. When this is done the position of the slots with respect to the shell 400, and therefore with respect to the contacts 416, is fixed thereby accurately locating the angular position of the lower ferrule with respect to those contacts, since the angular position of the fuse with respect to the chuck at the chuck jaws 453 and 465 is accurately fixed due to the flat surfaces of the upper ferrule engaging the chuck jaws.

The contact jaws 453 and 465 are further pressed against the ferrule 427 by the spring pressed contacts 430 mounted within the fuse holder as previously explained.

The contacts 430 are connected to a copper ring 490 by means of flexible leads 491. A circuit to the fuse is established by means of a forked clip 500 which is adapted to be pushed into engagement with the ring 490. The clip and the manner in which the same is placed about the contact ring 490 is shown more particularly in Figs. 18, 19 and 20. The clip 500 comprises a pair of spring jaws 501, of a construction similar to the jaws of a switch, which are adapted to embrace the contact rings 490. A threaded bolt 505 is secured to the upper end of the clip 501 and constitutes the means for inserting or removing the clip from the contact ring. A flexible copper conductor 85, having a copper tube 507 compressed thereupon, is held upon the top portion of the clip 501 by a nut 508. The flexible conductor 85 is connected to the lower end of the pothead 82 as indicated in Fig. 4. The jaws 501 of the clip embrace a flat portion 515 of the ring 490 and thereby establish a good electric circuit between the conductor entering the oil switching tank through the pothead 82 and the fuse held in the fuse holder 78. Guide strips 518 of fiber or other suitable insulating material are secured to the micarta ring or tube 400 and serve to guide the clip 500 into engagement with the contact ring 490. The fiber guides serve to guide the clip 500 into engagement with the contacting portion 515 of the contact ring.

Should there be a violent blowing of the fuse 425 such as would break the glass tube 426, it becomes necessary to remove the fuse holder from the oil tank shown in Fig. 4 in order to remove the broken glass from the bottom portion of the fuse holder.

The broken glass, as well as the lower ferrule 418, must be removed, of course, from the fuse holder before a new fuse can be inserted into place. To remove the fuse holder from the tank a tool such as shown in Fig. 22 is used. This avoids the necessity of reaching down into the oil of the oil tank with the bare hand. To remove the fuse and fuse holder the cover 92 of Fig. 4 is opened and the chuck secured to the insulator 468 and as much of the fuse as is held in the chuck is removed by manually gripping the handle 470 and pulling the same outward from the oil tank. The tool 530 of Fig. 22 is then inserted into the oil of the tank shown in Fig. 4 and the end 531 of that tool, which comprises a standard nut, is threaded onto the bolt 505 in the manner shown in Fig. 18. When the nut 531 has been threaded upon the bolt 505 by a sufficient amount, the tool 530 is pulled upward thereby withdrawing the clip 500 from the contact ring 490. The clip 500 is then inserted upon the member 86 (Fig. 4) at the lower end of the pothead 80a. The tool 530 may then be unthreaded from the bolt 505 and withdrawn from the oil tank. The clip 500 is placed upon the member 86 in order to locate it in a definite position for engagement by the nut 531 when the same is to be reinserted in place on the fuse holder after the same has been removed and reinserted. The other end of the tool 530 is then inserted into the oil tank and the cross rod member 535 is inserted into the fuse holder with the ends 536 thereof passing through the slot 481 in the fuse holder.

The slot 481 constitutes one portion of a bayonet joint formed in the fuse holder tube 400 and the member 435 is inserted into this joint until the ends 436 thereof rest in the opening 538. A disc member 540 of maple or other suitable material is mounted upon the tool 530 and is slidable thereon. The spring 541 forces the member 540 into the position shown in Fig. 22. As the tool is inserted into the bayonet joint, the member 540 butts the top of the tube 400 and upon further insertion of the tool into the joint the member 540 slides along the tool, placing the spring 541 under compression. The spring 541 thus serves to maintain the rod 535 firmly in place in the joint. With the tool firmly inserted into the joint, the tool is turned thereby turning the tube 400 and with it the spindle 407 and the lock nuts 408 and 409 held thereon. The spindle is thus turned out of the insulator 77 and may then be withdrawn from the oil tank shown in Fig. 4 through the open pipe 91. The fuse holder may then be cleaned as desired and may then be reinserted in place in the same manner in which it was removed. Upon inserting the fuse holder in place the holder is turned by means of the tool 530 to thread the bolt or spindle 407 into the insulator 77. The fuse holder is turned until the lock nuts 408 and 409 jam against the member 410.

These lock nuts are adjusted upon the bolt 407 so that this jamming takes place when the portion 515 (Fig. 20) of the tube 400 is opposite the member 86 (Fig. 4) at the lower end of the pothead. The tool is then removed from the bayonet joint and the other end of the tool is inserted into the oil tank and the nut 531 is threaded upon the bolt 505 of the fuse clip 500 which is now held upon the member 86 in the oil tank. The clip may then be withdrawn from the member 86 and inserted upon the member 515 of the contact ring 490. The tool is then removed from the oil tank and the fuse holder is now in condition to receive a fresh fuse.

A plate member 469 (Figs. 15 and 16) is secured to the conical member 463. This plate member has a dual function. When the chuck holding the fuse is inserted into the fuse holder, the plate member 469 butts against the upper portion of the bolt 505 and if the clip 500 has not been fully inserted upon the contacting portion 515 of the ring 490, this plate 469 forces it downward into firm engagement. In addition, this ring prevents the insertion of the tool shown in Fig. 22 to engage the clip 500 while the fuse holding chuck is in place.

It is to be noted that to remove the fuse or to insert the same in position the cover 92 must be opened and this cannot be done unless the pole top switch 2 (Figs. 2 and 3) is open, due to the interlock arrangement previously described.

As an additional safety measure it is to be noted that the spring members 472, which may be of bronze or other suitable conducting material, engage the pipe section 91 as may be seen in Fig. 4, thereby grounding the upper portion of the fuse holder rendering the manipulation of the fuse perfectly safe.

An alternative structure for gripping the upper end of the fuse for inserting the same into the fuse holder 78 is shown in Figs. 23 to 27 inclusive. This fuse holder comprises a tube 560 of copper or other suitable conducting material bored out at the bottom portion to provide a shoulder as indicated at 561 to receive the upper ferrule of a fuse. Two rectangular holes are formed on opposite sides of the tube 560 at the lower portion thereof for receiving a pair of contact jaws 563 which may be made of brass or any other suitable electrical conducting material. A pair of flat iron clips 564 and 565 are secured to the tube 560 on opposite sides of the rectangular holes. The clips are bent at 569 and serve to retain the contact jaws 563 within the slots in the lower portion of the tube 560 as will be presently pointed out. A hole or slot 568 is formed in each of the bent in holding portions 569 of the clip 564. The contact jaws 563 each have two pins 570 and 571 extending therethrough. The fuse 425, shown in dotted line in Fig. 24, is inserted into the tube 560 until the upper end of the upper ferrule butts against the shoulder 561. The contact jaws 563 are then inserted into the rectangular openings in the tube 560, the upper pins 570 passing through the slots 568 in the members 564 and the lower pins 571 passing below the lower end of the member 564.

When the jaws have been inserted into a position to engage the flat contacting surface of the ferrule the jaws are pushed upward a slight amount so that the pins 570 and 571 assume the position shown in Fig. 24. A nut 575 is then threaded onto the lower portion of the tube 560 to support the jaws 563 in an elevated position. The members 564 and 565 prevent the withdrawal of the contact jaws 563 unless the same are first pushed downward so that the pin 570 may pass through the slot 568 and the pin 571 may pass below the member 564. This cannot be done until the nut 575 is turned downward. It may thus be seen that the contact jaws 563 are held against the ferrule of the fuse and the fuse is thereby held against downward removal from the fuse holder. A pair of flexible copper ribbons 576 hold the jaws 563 against misplacement when the jaws are removed from the openings in the tube 560. The ribbons 564 are secured to the tube 560 by suitable screws or the like. A bale 578 is secured to the member 564, and a locking lug 579 is loosely and slidably held in a slot 577 therein. The nut 575 is provided on its outer surface with a number of spaced notches 580 and when the nut is being turned on or off of the tube 560 the lug 579 is pushed upward through the slot so as to be out of the path of motion of the nut. When the nut has been screwed into position it is turned around so that one of the notches 580 is immediately beneath the member 579 and the member 579 is then allowed to drop down through the notch 580 thereby holding the nut 575 against turning.

To remove the nut 575 the lug 579 is raised out of the notch, thereby permitting the turning of the nut 575. A metal member 583 having projecting arms 584 and 585 is secured to the tube 560. When the fuse held in the member shown in Figs. 23 and 24 is inserted into the tubular holder 400 of Fig. 15 the arms 584 and 585 pass through the slots 481—482 for locating the angular position of the fuse within the fuse holder as was previously pointed out. A plate like member 587 is brazed or otherwise suitably secured to the top of the tube 560 and serves the purpose of the member 469 in the mechanism shown in Figs. 15 and 16. In addition a screw 590 is secured to the member 587, said screw being adapted to thread into an insulator such as the insulator 468 of Figs. 15 and 16 which insulator supports a handle portion such as is shown in Figs. 15 and 16. A handle such as shown in Figs. 15 and 16 is threaded onto the screw 590 and the fuse held in the holder 560 may then be inserted into the tube 400 of Figs. 15 and 16 in the same manner as was the chuck previously described in connection with those figures. Under these conditions the spring pressed contact jaws 430 shown in Figs. 15 and 16 press against the contact jaws 563 to establish a circuit between the ferrule of the fuse and the clip 500. Rectangular openings 593 are formed on opposite sides of the top portion of the tube 560 in order to permit the free escape of gases that may be formed upon the explosion of the fuse and also to provide for access to the screw 590.

In connection with the holder shown in Figs. 23 to 27 inclusive, it is to be noted that if desired a single removable handle, such as the handle shown in Figs. 15 and 16, may be used in conjunction with a number of such fuse holders, the handle being unscrewed from the screw 590 when the fuse has been inserted into place. The handle, of course, would include the insulator 468 of Fig. 15 and the portions of the apparatus above that insulator. It is of course understood that if desired individual handles may be provided for each of the fuse holders.

The fuses here used are Schweitzer & Conrad fuses as previously stated, although the invention is not limited to the use of fuses of any particular design. The upper ferrule of the fuses is provided with an explosion cap at the upper end thereof, which cap may be blown outward during the blowing of the fuse. In connection with the fuse holder it must be noted that the shoulder 561 in the tube 560 is of such a size as not to interfere with the upward movement of the explosion cap when the same is blown outwardly. In this respect the fuse holder shown in Figs. 23 to 27 is preferable to the one shown in Figs. 15 and 16 for in the fuse holder shown in Figs. 15 and 16 the member 440 will interfere with the free expulsion of the fuse cap.

In compliance with the requirements of the patent statutes, I have herein shown and described a preferred embodiment of my invention. It is, however, to be understood that the invention is not limited to the precise construction herein set forth, the same being shown merely for illustrative purposes.

What I consider new and desire to secure by Letters Patent is:

1. In an electrical system, a high voltage transmission line, a transformer bank including a spare transformer, a switch and fuse cabinet between the high voltage side of the transformer bank and the transmission line, an insulating liquid in said cabinet, switches immersed in the liquid, fuses in said cabinet, said fuses and switches comprising means for connecting the transformers to the transmission line, a switching cabinet including switches connected to the low tension side of the transformers, connections in each of the cabinets including the switches therein for substituting the spare transformer for any one of the others, and interlocks between the switches in the two cabinets for preventing the operation of non-corresponding switches in the two cabinets.

2. In an electrical system, a supporting tower, a high voltage transmission line terminating at said tower, gang operated air break switches on top of the tower, said line being connected to said switches, a switch and fuse cabinet, an insulating liquid therein, connections between the other side of said switches and said cabinet, switches immersed in the liquid, fuses in said cabinet, a transformer bank including a spare transformer, said fuses and switches comprising means for connecting the transformers to the transmission line, a switching cabinet including switches connected to the low tension side of the transformers, connections in each of the cabinets including the switches therein for substituting the spare transformer for any one of the others, and interlocks between the switches in the two cabinets for preventing the operation of non-corresponding switches in the two cabinets.

3. In an electrical system, a supporting tower, a high voltage transmission line terminating at said tower, gang operated air break switches on top of the tower, said line being connected to said switches, a switch and fuse cabinet, an insulating liquid therein, connections between the other side of said switches and said cabinet, switches immersed in the liquid, fuses in said cabinet, a transformer bank including a spare transformer, said fuses and switches comprising means for connecting the transformers to the transmission line, a switching cabinet including switches connected to the low tension side of the transformers, connections in each of the cabinets including the switches therein for substituting the spare transformer for any one of the others and interlocks between the switches in the cabinets and the first mentioned switches to prevent operation of the switches in the cabinets while the switches on the tower are closed.

4. In a high voltage system, a transmission line, an oil containing fuse and connection cabinet, fuses mounted in said cabinet, openings in said cabinet adjacent the respective fuses for permitting access to the fuses, closures for the openings, connections between the transmission line and the fuses, a plurality of single phase transformers, a spare transformer, switches in said cabinet connected to said transformers and said fuses for connecting said transformers in circuit with said fuses and for substituting the spare transformer for any one of the others, and interlocks between the switches and the closures.

5. In an electric system, a plurality of transformers, a switching cabinet on the primary side of the transformers, a switching cabinet on the secondary side of the transformers, said transformers including a spare transformer, and said switching means on both sides of the transformers including means for substituting the spare transformer for any one of the other transformers, and interlocks between the two cabinets for preventing the operation of non-corresponding switches in the two cabinets.

6. In a high voltage system, a transformer bank comprising a plurality of transformers including a spare transformer, air break selector switches enclosed in an oil cabinet and connected to the high tension side of the transformers for switching the high tension side of the spare transformer in circuit in lieu of the high tension side of any one of the other transformers, selector switches enclosed in another cabinet for switching the low tension side of the spare transformer in lieu of the low tension of any one of the other transformers, and interlocks for preventing the simultaneous closure of the switches corresponding to more than one transformer of the bank.

7. In a high voltage distribution center, a supporting tower, a high voltage transmission line terminating at said tower, a fuse cabinet at the base of the tower, inverted pot heads extending into the cabinet, conduit enclosed conductors terminating at said pot heads and extending towards the transmission line, and connections between the conduit enclosed conductors and the transmission line.

8. In an electric power system, a power transformer bank, a high voltage transmission line, switching means for establishing any one of a plurality of predetermined combinations of connections between the high voltage side of the transformer bank and the transmission line, and means for preventing the operation of the switching means outside of the predetermined combinations of connections.

9. In an electric power system, a power transformer bank, a high voltage transmission line, switching means for establishing any one of a plurality of predetermined combinations of connections between the high voltage side of the transformer bank and the transmission line, means for preventing the operation of the switching means outside of the predetermined combinations of connections, a second power line, and switching means for establishing connections between the low voltage side of the transformer bank and the second power line in any one of a plurality of combinations corresponding to the combinations set up by the switching means on the high voltage side.

10. In an electric power system, a power transformer bank, a high voltage transmission line, switching means for establishing any one of a plurality of predetermined combinations of connections between the high voltage side of the transformer bank and the transmission line, means for preventing the operation of the switching means outside of the predetermined combinations of connections, a second power line, switching means for establishing connections between the low voltage side of the transformer bank and the second power line in any one of a plurality of predetermined combinations corresponding to the combinations of the switching means on the high voltage side, and means for preventing operation of the second mentioned switching means outside of the predetermined combinations of connections.

11. In an electric power system, a power transformer bank, a high voltage transmission line, switching means for establishing any one of a plurality of predetermined combinations of connections between the high voltage side of the transformer bank and the transmission line, means for preventing the operation of the switching means outside of the predetermined combinations of connections, a second power line, switching means for establishing connections between the low voltage side of the transformer bank and the second power line in any one of a plurality of predetermined combinations corsponding to the combinations of the switching means on the high voltage side, and means for preventing operation of the second mentioned switching means outside of the predetermined combinations of connections and for preventing the setting up of non-corresponding combinations of connections on the two sides of the transformer bank.

12. In an electric power system, a power transformer bank, a high voltage transmission line, switching means for establishing any one of a plurality of predetermined combinations of connections between the high voltage side of the transformer bank and the transmission line, means for preventing the operation of the switching means outside of the predetermined combinations of connections, a second power line, and switching means for establishing connections between the low voltage side of the transformer bank and the second power line in any one of a plurality of predetermined combinations corresponding to the combinations of the switching means on the high voltage side, and means for preventing the setting up of non-corresponding combinations of connections on the two sides of the transformer bank.

In witness whereof, I hereunto subscribe my name this 22nd day of May, 1929.

ERNST BLOMQUIST.